US009471665B2

(12) United States Patent
Snell

(10) Patent No.: US 9,471,665 B2
(45) Date of Patent: Oct. 18, 2016

(54) UNIFIED SYSTEM FOR REAL-TIME COORDINATION OF CONTENT-OBJECT ACTION ITEMS ACROSS DEVICES

(71) Applicant: nCino, Inc., Wilmington, NC (US)

(72) Inventor: Nathan Snell, Wilmington, NC (US)

(73) Assignee: NCINO, INC., Wilmington, NC (US)

( * ) Notice: Subject to any disclaimer, the term of this patent is extended or adjusted under 35 U.S.C. 154(b) by 0 days.

(21) Appl. No.: 14/993,328

(22) Filed: Jan. 12, 2016

(65) Prior Publication Data

US 2016/0125070 A1 May 5, 2016

Related U.S. Application Data

(63) Continuation-in-part of application No. 14/590,714, filed on Jan. 6, 2015, now Pat. No. 9,268,819, which is a continuation of application No. 14/516,363, filed on Oct. 16, 2014, now Pat. No. 9,098,875.

(60) Provisional application No. 62/032,239, filed on Aug. 1, 2014, provisional application No. 62/102,196, filed on Jan. 12, 2015.

(51) Int. Cl.
*G06F 7/00* (2006.01)
*G06F 17/30* (2006.01)
*H04L 12/24* (2006.01)
*G06Q 10/06* (2012.01)

(52) U.S. Cl.
CPC ... *G06F 17/30607* (2013.01); *G06F 17/30126* (2013.01); *G06F 17/30525* (2013.01); *G06F 17/30657* (2013.01); *G06F 17/30867* (2013.01); *G06Q 10/06312* (2013.01); *H04L 41/22* (2013.01); *G06Q 10/0635* (2013.01)

(58) Field of Classification Search
CPC .......................... G06Q 10/06; G06Q 10/0635
USPC .................. 707/608, 736, 694, 702; 705/35; 717/712
See application file for complete search history.

(56) References Cited

U.S. PATENT DOCUMENTS

| | | | |
|---|---|---|---|
| 5,630,069 A * | 5/1997 | Flores | G06Q 10/0633 705/7.27 |
| 8,572,083 B1 | 10/2013 | Snell et al. | |
| 8,762,376 B2 | 6/2014 | Snell et al. | |
| 9,082,151 B2 | 7/2015 | Snell et al. | |
| 9,098,875 B2 | 8/2015 | Snell et al. | |
| 9,268,819 B1 | 2/2016 | Snell et al. | |
| 2005/0093881 A1* | 5/2005 | Okita | G06Q 10/06 345/589 |
| 2007/0055596 A1* | 3/2007 | Yankovich | G06Q 40/02 705/35 |
| 2007/0100990 A1* | 5/2007 | Brown | H04L 43/0817 709/224 |
| 2007/0150330 A1* | 6/2007 | McGoveran | G06Q 10/06 705/7.13 |
| 2009/0248560 A1* | 10/2009 | Recce | G06Q 20/04 705/35 |
| 2012/0215812 A1* | 8/2012 | Gilstrap | G06Q 10/10 707/781 |
| 2015/0248724 A1 | 9/2015 | Snell et al. | |

OTHER PUBLICATIONS

U.S. Appl. No. 61/714,647, filed Oct. 16, 2012.
U.S. Appl. No. 61/652,970, filed May 30, 2012.
U.S. Appl. No. 61/652,977, filed May 30, 2012.
U.S. Appl. No. 61/792,011, filed Mar. 15, 2013.
U.S. Appl. No. 62/032,239, filed Aug. 1, 2014.
U.S. Appl. No. 62/102,196, filed Jan. 12, 2015.
U.S. Appl. No. 62/187,487, filed Jan. 12, 2015.

* cited by examiner

*Primary Examiner* — Cheyne D Ly
(74) *Attorney, Agent, or Firm* — Kilpatrick Townsend & Stockton LLP

(57) ABSTRACT

Techniques disclosed herein can pertain to querying an object structure using an index to determine whether a content object of a specified type has been stored. Further, a request workflow can be evaluated in view of one or more exceptions. At least one action item can be generated based on a result of the query and the workflow evaluation.

17 Claims, 15 Drawing Sheets

UNIFIED SYSTEM FOR REAL-TIME COORDINATION OF CONTENT-OBJECT ACTION ITEMS ACROSS DEVICES

CROSS-REFERENCES TO RELATED APPLICATIONS

This application is a continuation-in-part of U.S. application Ser. No. 14/590,714, filed on Oct. 16, 2014, which is a continuation of U.S. application Ser. No. 14/516,363, filed on Oct. 16, 2014, which claims the benefit of and priority to U.S. Provisional Application No. 62/032,239, filed on Aug. 1, 2014. This application also claims the benefit of and priority to U.S. Provisional Application No. 62/102,196, filed on Jan. 12, 2015. Each of these applications is hereby incorporated by reference in its entirety for all purposes.

BACKGROUND

Storage, retrieval and processing of data included in electronic content objects have become increasingly complicated. The number of devices producing such content objects have increased, as have the types and formats of content objects. Further, technological advancements have enabled given equipment to produce or store a larger amount of data.

Frequently, data in one or more select first content objects relate to data in one or more second content objects. For example, the first and second content objects can each relate to usage of a same electronic device or to processing of a same request. In some instances, generation and/or processing of one content object requires receipt and/or processing of another content object. While access to inter-related data files provides a potential to capitalize on a rich data set, complexities of managing inter-related data files can scale exponentially as data size increases.

SUMMARY

In some embodiments, a coordinated system is provided for managing content objects and workflows across devices. An object structure associates, for each of a plurality of content objects, an identifier of the content object with one or more indices. A workflow rules data store includes a request workflow that identifies: each of a plurality of states within the request workflow; a first progression criterion for progressing from a first state in the plurality of states to a second state in the plurality of states, the first progression criterion including detection of a content object of a defined first type; and a second progression criterion for progressing to a third state in the plurality of states, the second progression criterion including detection of a content object of a defined second type. A chronicle processor queries the object structure using an index and that receives a query result indicating that the content object of the defined first type was not detected. A workflow manager includes one or more processors and determines that an exception to the request workflow exists for the index that permits at least temporary progression from the first state to the second state despite lack of a detection of the content object of the defined first type. The exception can be one having been generated in response to an action performed at a client device. The workflow manager also identifies, in correspondence to the index, a current state within the request workflow as being the second state; and identifies a content-object action item defined in a progression criterion for progressing to the third state, the content-object action item identifying the defined second type. A graphical user interface (GUI) generator generates a notification for presentation at a user device that identifies: the second state or the third state; and the content-object action item.

In some embodiments, a computer-implemented method is provided for managing content objects and workflows across devices. A request workflow is accessed that identifies: each of a plurality of states within the request workflow; a first progression criterion for progressing from a first state in the plurality of states to a second state in the plurality of states, the first progression criterion including detection of a content object of a defined first type; and a second progression criterion for progressing to a third state in the plurality of states, the second progression criterion including detection of a content object of a defined second type. Using an index and using one or more processors, an object structure is queried. The object structure associates, for each of a plurality of content objects, an identifier of the content object with one or more indices. A result to the query is detected, the result indicating that a content object of the defined first type was not detected. It is determined that an exception to the request workflow exists for the index that permits at least temporary progression from the first state to the second state despite lack of a detection of the content object of the defined first type, the exception having been generated in response to an action performed at a client device. In correspondence to the index, a current state within the request workflow is identified as being the second state. A content-object action item defined in a progression criterion for progressing to the third state is identified. The content-object action item identifies the defined second type. A notification is generated for presentation at a user device. The notification identifies the second state or the third state and the content-object action item.

In some embodiments, a non-transitory computer-readable medium is provided that includes one or more sets of instructions stored thereon which, when executed by one or more processors, cause the one or more processors to perform one or more actions included in a method or process disclosed herein.

BRIEF DESCRIPTION OF THE DRAWINGS

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

The present disclosure is described in conjunction with the appended figures.

Figure 1:
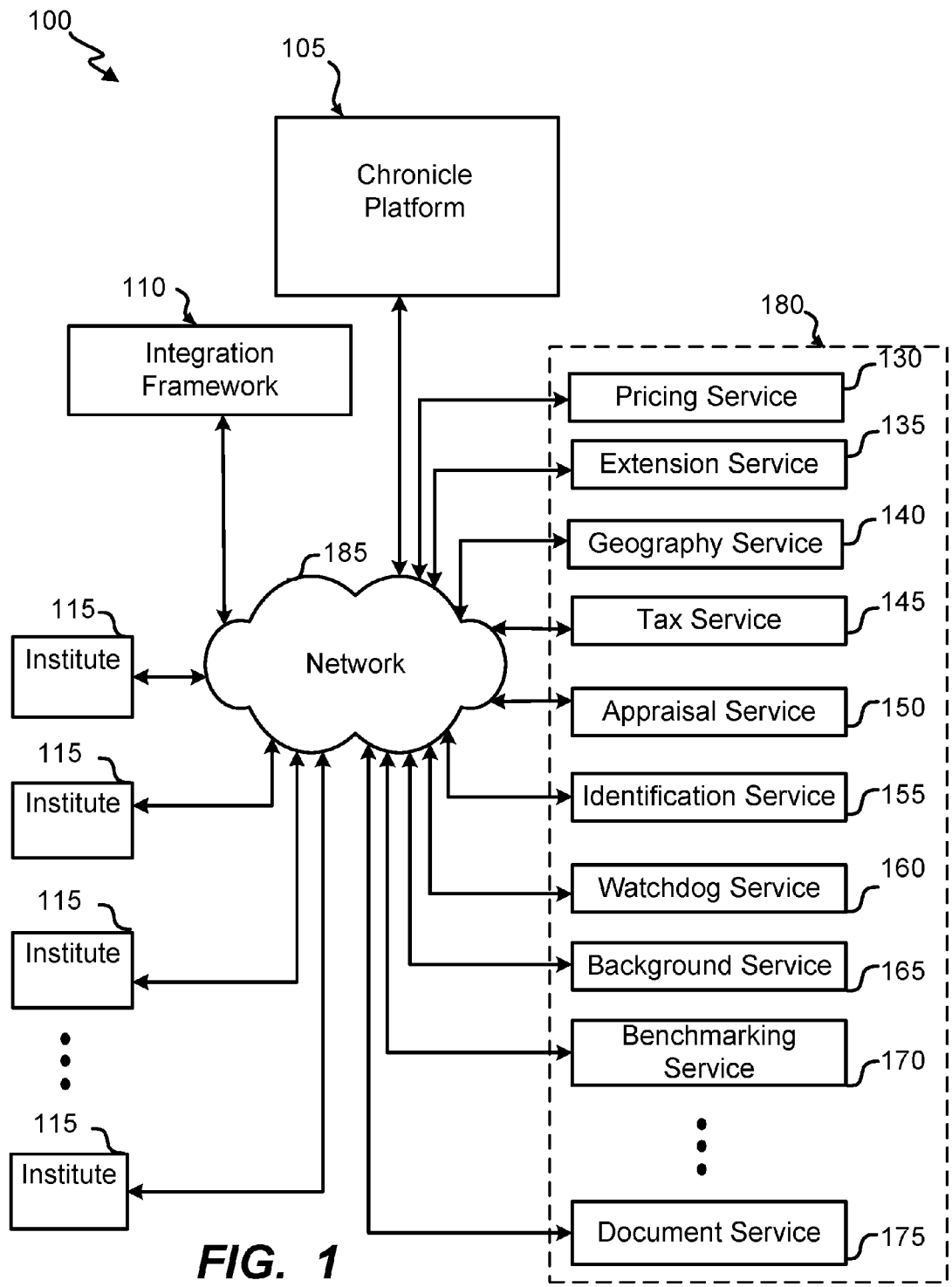
FIG. 1 depicts a block diagram of an embodiment of a chronicle system.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a method and system for evaluating a workflow for receiving and processing content objects. A workflow can specify, for example, which content objects are to be generated and/or collected, how the content objects are to be processed and/or an entity responsible for providing various content objects or content object data or for processing. Individual implementations of a given workflow can be initiated and progress across the workflow can be tracked, for example, via processing of signals received from other devices and/or routine assessments of content objects and content-object data. In some instances, each implementation is associated with a particular index (e.g., identifying an entity, request or time period), and database management system 150 can determine workflow progress based on whether content objects associated with the index exist in a data store and/or data within or associated with such content objects.

The workflow can be used in each of a set of workflow implementations, where each workflow implementation can relate to different data. For example, an index may correspond to a particular request, device, user or product, and content objects associated with the index can be processed according to the workflow so as to derive a workflow result. Accordingly, each of a set of content objects may be tagged or otherwise associated with one or more indices such that appropriate objects can be retrieved and/or identified for a particular workflow implementation.

A workflow can identify a plurality of states. In some instances, the workflow includes a sequence that specifies that each of one or more tasks corresponding to a first state is to be completed before a second state is entered (e.g., and so on). Depending on the embodiment, the plurality of states may, or may not, be configured for overlap, such that a process can be within multiple states concurrently.

The workflow can further identify one or more progression criteria that, when satisfied, enable or trigger a state to change. A progression criterion may include detection that one or more tasks (e.g., which may include provision of one or more content objects or data values of specified types) have been completed. A progression criterion can identify a type of content object that is to be received. For example, the progression criterion can indicate that a content object having a particular format, of a particular file type, having a particular type of data (e.g., any value for a given field or a particular value for a field) and/or having been received from a particular device is required for state progression. A progression criterion can alternatively or additionally specify a required status for each of one or more content objects. For example, a criterion may indicate that a particular type of content object associated with a particular index must exist and have been approved. A progression criterion can alternatively or additionally specify a type of processing of one or more content objects and/or a result of such processing. For example, it may be required that a value of a particular field in a content object be the same as or otherwise correspond a value of another field in the same or a different content object or exceed a threshold.

Progression criteria can be used to generate action items. Which action items are generated can depend on, for example, action dependencies (e.g., such that an action item to process a content object is not generated before the content object is available for processing), a current state (e.g., such that action items are biased towards criteria associated with near-term state progressions over those associated with other progressions), and/or criteria assignment (e.g., such that action items are generated for criteria assigned to a particular entity for completion). An action item can relate to a criterion for progressing from a current state to a new state or between two other states (e.g., such that if a workflow is at state #1, an action item can relate to progressing between states #2 and #3). An action item can include one that supports generation of, or updating of, a chronicle. Each action item can be associated with a particular entity, which may be responsible for performing the action item (e.g., providing or processing a content object). A queue can be generated that includes a set of action items (e.g., associated with a particular entity). Items in the queue may pertain to a particular implementation of a workflow (e.g., processing a single request) or to multiple implementations (e.g., pertaining to multiple requests). Action items can be ordered and/or prioritized according to, for example, a sequence in a workflow (e.g., prioritizing action items associated with states or progression criteria earlier in the workflow), A set of action items can include those required for a request to be completed and/or for a request to progress across particular states in a workflow. In some instances, the set of action items is defined such that each action item in the set of action items is assigned to the requestor rather than an institute agent. However, configurations may be established so as to enable assignment of one or more action items to be transferred to another user or agent. In order to generate a request and/or complete a set of action items, in some instances, part of a back-end chronicle platform may be made accessible to (e.g., transmitted to automatically or upon request and/or transformed to a configuration accessible to the requestor device) to a requestor device. Transfer of an action item corresponding to a request may have an effect of establishing a permission for the other user or agent to access and/or provide data (e.g., all data or select data) pertaining to the request via the chronicle platform.

Assignments of action items may be conditionally transferred or transferred for a defined time. For example, a transfer of an assignment of an action item may be negated such that the action item is again assigned to an original requestor or other entity if the action item is not completed by a particular time or upon detecting a particular trigger (e.g., detecting that one or more other action items are completed). An assigning entity (e.g., a user representing a requestor) may monitor a status of an action item, so as to determine (for example) whether, when, an extent to which and/or how an action item has been completed. For example, an assigning entity may be able to access any content item and/or data provided by a user device in association with an action item for the request. An alert may also be sent to an assigning entity if an action item has not been completed by a particular time (e.g., an institute-specified deadline or a time specified by the assigning entity).

In some instances, one or more potential action item assignments are generated for a request based on one or more previous transfers, previous action-item completions and/or interconnect webs (e.g., such as a web described in U.S. application Ser. No. 14/590,714, filed on Oct. 16, 2014, which is hereby incorporated by reference in its entirety for all purposes). For example, an interconnect web may indicate that a corporate loan applicant is related to each of one or more users via the users' respective positions. Particular action items may then be associated with potential assignments to these related users. As another example, it may be determined that a requestor has transferred assignment of a particular type of action item to a given entity for a previous request, and the entity may be identified within a potential assignment.

In some instances, a workflow can be modified in accordance with one or more exceptions. An exception can be defined so as to modify a progression criterion (e.g., to remove, add or modify a requirement for receipt or particular processing of a content object). For example, an exception can indicate that a particular content object typically required for advancement from State #2 to State #3 is not to be required for such progression. The exception can thereby also cause a queue of action items to be modified.

An exception can apply to a single implementation or a set of implementations of a particular workflow while not applying to one or more other implementations of the particular workflow. The exception can be set in response to receiving input from an authorized client that indicates that the exception is to apply (e.g., to a workflow implementation associated with a given index). The exception can be temporary or permanent. For example, the exception can apply for a defined period of time or until a particular state is reached (e.g., allowing a state to progress from #2 to #3 without receipt of a content object but requiring it before the state can progress to #4). Application of the exception can be conditional or unconditional. For example, the exception can apply until a particular processing result is detected (e.g., that a value of a field in another content object exceeds a threshold).

FIG. 1 depicts a block diagram of an embodiment of a chronicle system 100. This embodiment of the chronicle system 100 is built on a multitenant platform such as the Salesforce™ Force.com platform. The multitenant platform is used to provide services from one tenant to multiple unrelated tenants. Each institute 115 is at least one tenant on the multitenant platform and each tenant uses services on the multitenant platform. A chronicle platform 105 and an integration framework 110 are each tenants on the multitenant platform that provide services to other tenants. An advantage of a multitenant platform is that it is unnecessary for tenants in the multitenant platform to be co-located and, as such, tenants can be separated geographically in some cases but share a geographic location in other cases. Another advantage of using a multitenant platform is that each of the institutes 115 tenants on the multitenant platform use the chronicle platform 105 and/or the integration framework 110 over a network 185 such that it is unnecessary for each of the institutes 115 to host their own chronicle platform 105 or integration framework 110. In other embodiments of the chronicle system 100, at least one of the institutes 115 host the chronicle system 100 and/or provide portals to the chronicle system 100.

The institutes 115 use the integration framework 110 and the chronicle platform 105 to perform, for example, chronicle processing, access management, status monitoring, version generation, backing processing, data aggregation, and report generation. The institutes 115 are entities that fulfill a resource request (e.g., credit unions). The institutes 115 use a resource memorandum in completed form to grant or deny the resource request. The resource memorandum describes, among other things, a qualification profile of a resource requestor.

The chronicle platform 105 builds and updates the resource memorandum while it is processing the resource request. For instance, in some cases the chronicle platform 105 generates the resource memorandum that indicates the resource requester is not qualified for the requested resource. In that case the institute 115 can deny the resource request or take alternative action. Initially the chronicle platform 105 assigns each resource request a resource request identifier and the resource memorandum is associated with the resource request by the resource request identifier. The chronicle platform 105 also initially assigns a version identifier to the resource memorandum in order to trace subsequent versions of the resource memorandum that the chronicle system 100 uses while it processes the resource request. While the chronicle platform 105 retains the same resource request identifier while processing the resource request, the resource memorandum will evolve through many versions during the same process and each time the chronicle platform captures the version of the resource memorandum, it will assign a new version identifier to the loan memorandum when it is captured. Accordingly, when the chronicle platform is processing the resource request it creates a traceable history of versions of the resource memorandum that the institutes 115 various agents can audit.

The network 185 connects each of the institutes 115 with the integration framework 110, the chronicle platform 105, and one or more data services 180. The network 185 can include, for example, the Internet, an intranet, a secure network, a virtual private network, a local area network, a wide area network, or a wireless network. The network 185, for example, uses encrypted communications to securely transmit data in some embodiments. The network 185 can connect each of one or more institutes 115 with the integration framework 110, the chronicle platform 105, and one or more data services 180 using standard or custom APIs in some embodiments or with any other method or protocol to communicate over a network.

The data services 180 send service data to the institutions 115 and/or the integration framework 110 on the network 185 through to the chronicle platform 105. The chronicle platform 105 uses the service data to, for example, process chronicles, capture resource memorandum versions, aggregate data, and generate reports that the institutes 115 use to grant or deny resource requests. In one instance, the chronicle platform 105 detects, for each chronicle, which content buckets associated with the chronicle have been filled with a corresponding content object. The detection can include, for example, identifying particular content buckets based on a request type and checking a status of each of the particular content buckets in correspondence with resource request identifier.

The data services 180 include any number of third party services providing data to the chronicle system 100 including a pricing service, an extension service, a geography service, a tax service, an appraisal service, an identification service, a watchdog service, a background service, a benchmarking service, and a document service. The data services 180 send the service data to integration framework 110. The data services 180 retrieve data from a number of reporting services. For example, the pricing service retrieves data from sources including PrecisionLending™, and the extension service retrieves data from reporting services including CBC Innovis™ and Dunn and Bradstreet™. The geography service retrieves data from reporting services that include FEMA's Flood Map Services Center. The tax service retrieves tax data from reporting services, including, for example, city, county, state, and federal taxing authorities. And the appraisal service retrieves data from reporting services, including, for example, city, county and state appraisal agencies and Kelly Blue Book™. The identification service uses reports from services like Moody's™, Westlaw™, and LexisNexis™ are included in the reporting services that provide data to the watchdog service. One of the sources used by the background service is Equifax Business Connect™. The benchmarking service obtains reports from, for example Reuters™ RNA. The document service uses FIS FLO™ and LaserPro™ providers, among others. The integration framework 110 passes data from data services 180 to the chronicle platform 105 after it has transformed the data.

The integration framework 110 is also a tenant on the multitenant platform. The integration framework 110 receives data and requests in any variety of data formats from one or more sources including the institutes 115, the chronicle platform 105, and the data services 180. In some cases the institutes 115, the data services 180, and the chronicle platform 105 push data and/or requests to the integration framework 110. The integration framework 110 fulfills the request, transforms the data, and sends the data to the correct target. For example: the chronicle platform 105 sends a request for an extension report to the integration framework 110; the integrations framework 110 retrieves the report from the extension service 135; transforms it to a format compatible with the chronicle platform 105, and sends the result to the chronicle platform 105. The integration framework 110 receives data in real-time, in batches, or as updated data. The integration framework 110 uses servers and databases to transform the data from a source to a format compatible with the target it is intended for; and sends it to that target. For instance, when the chronicle platform 105 generates an updated resource memoranda for the institutes 115, it sends the updated resource memorandum to the integration framework 110, and then the integration framework 110 transforms the updated resource memorandum to a format expected by institutes 115, and sends it to institutes 115. The integration framework 110 receives and transforms data from other tenants on the multitenant platform concurrently in some cases or sequentially in others. The integration framework 110 is a first interface between both the institutes 115 and the data services 180 and the chronicle platform 105.

The chronicle platform 105 communicates with the institutes 115 and the integration platform 110 using the network 185. The chronicle platform 105 receives content objects from the institutes 115 and the integration framework 105. The chronicle platform 105 creates chronicles and populates the chronicles with the content objects (e.g., received from, or generated based on data received from, a user device, institute agent device, etc.). Each chronicle can pertain to one request, and the chronicle can include associated content objects and/or indications that one or more content objects of particular types have not been received. The chronicle can further include a status of each of one or more content object and/or the chronicle as a whole, which may relate to a level of completion and/or assessment.

The chronicle platform 105 processes the populated chronicles to update the resource memorandum and to generate reports and documents that the institutes 115 use to grant or deny the resource request. The chronicle platform 105 captures versions of the resource memorandum and creates a resource request processing history that the institutes 115 agents use for auditing purposes. The chronicle platform 105 generates the presentation and the resource memorandum for the institutions 115 in some cases in a web page format or as an API and in other cases in standard or custom document formats, such as Word™. The chronicle platform 105 also aggregates data from multiple tenants and generates corresponding reports for the institutes 115. The chronicle platform 105 also uses the aggregated data to process chronicles. The chronicle platform 105 serves institutes 115 concurrently in some cases or sequentially in other cases.

Figure 2A:
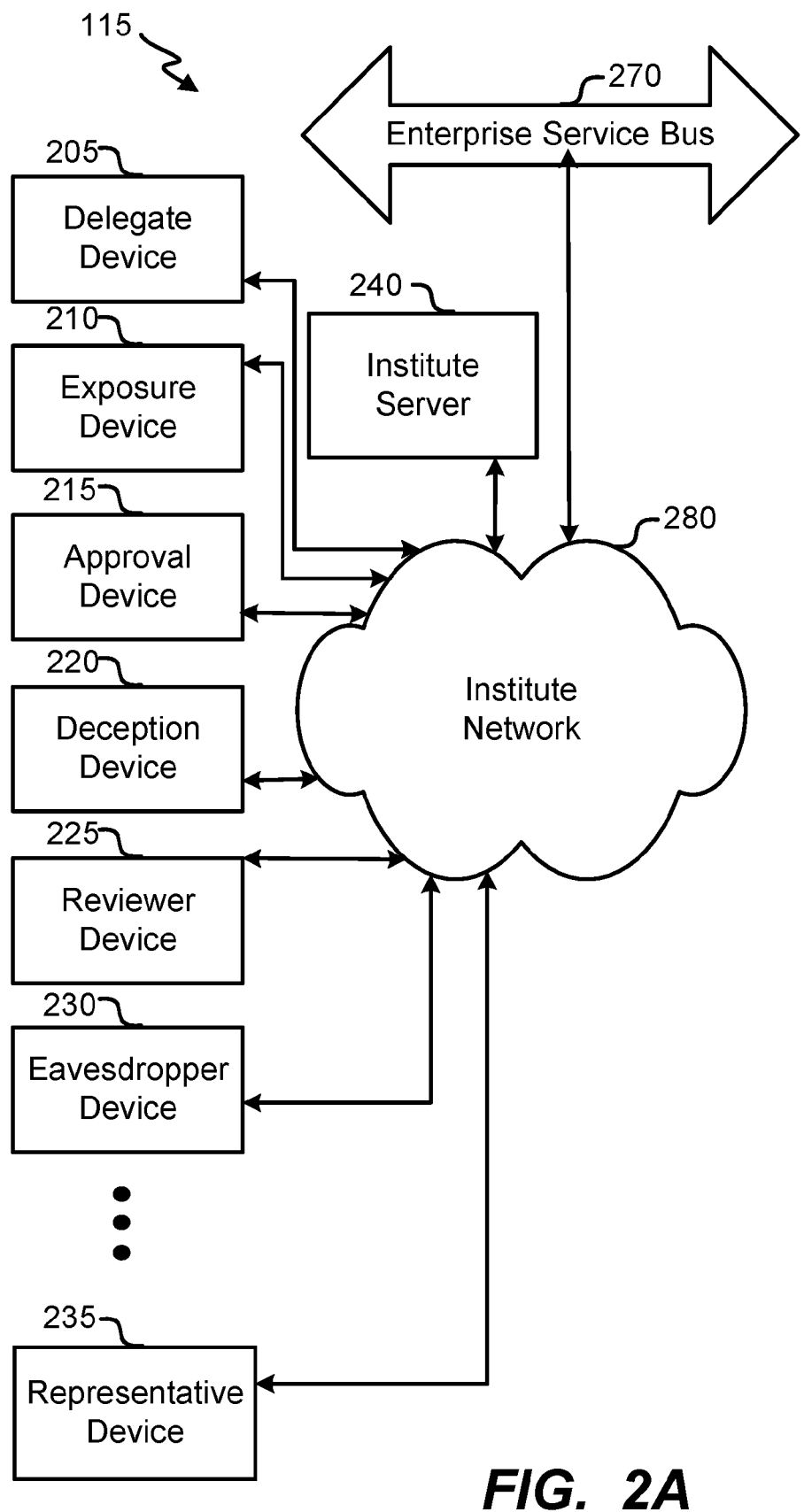
FIG. 2A depicts block diagrams of an institute.

FIG. 2A depicts a block diagram of an embodiment of an institute 115. The institute 115 are entities that grant or deny end-user resource requests such as for home mortgages. The institute 115 access the chronicle platform 105 to obtain, for example, chronicle processing, resource memorandum updating, version capture, backing processing, data aggregation, and report generation. The institute 115 internal agents include: a delegate agent using a delegate device 205; an approval agent using approval device 215; a deception agent using a deception device 220; a reviewer agent using a reviewer device 225; an eavesdropper agent using an eavesdropper device 230; a exposure agents using a exposure device 210; and a representative using a representative device 235. Although this block diagram of an embodiment of institute 115 shows only the single delegate device 205, the single approval device 215, the single deception device 220, the single reviewer device 210, the single representative device 235, the single end-user device 250, the single watchdog device 255, and the single eavesdrop device 260, in other embodiments the institute 115 include multiple devices in each instance that correspond to multiple agents. The devices comprise all manner of computing apparatus such as general purpose computers, mainframe computers, terminals connected to servers, desktop computers, notebook computers, tablet computers, pad computers, and smart phones. The institute 115 internal and third-party agents use devices that are connected by an institute network 280 to an institute server 240. The institute server 240 may also be connected to an enterprise service bus 270 and the data services 180 by the institute network 280.

The delegate agent is the loan officer in some cases and communicates with the end-user agent that initiated the resource request directly in some cases, for example, in-person or by telephone. The delegate agent requests data and documents from the end-user agent that are necessary to determine whether the end-user is qualified for the resource request. Alternatively the delegate device 205 communicates with the end-user device 250 over the institute network 280 via email, text, facsimile, or any other method of electronic communication. In most cases the chronicle platform 105 will trigger a version capture event when the delegate device 205 collects data from the end-user device 250. The delegate device 205 collects end-user agent data relevant to qualifying the end-user agent for the resource request and sends it to the enterprise service bus 270 or the institute server 240. The delegate device 205 makes requests for and accesses reports and documents that the chronicle platform 105 generates such as the resource memorandum. The delegate device 205 communicates over the institute network 280 with other internal devices including the exposure devices 210, the approval device 215, the deception device 220, the reviewer device 225, the eavesdropper device 230 and the representative device 235 over the institute network 280.

The exposure agent 210 evaluates risk associated with the institutes' 115 granting or denying a resource request. The exposure device 210 makes requests for and accesses reports and documents including the resource memorandum that the chronicle platform 105 generates. The exposure device 210 also requests additional data from the end-user device 250 in some cases when the chronicle platform 105 generates a report that indicates the end-user agent is associated with a high exposure that might be mitigated by additional end-user agent data. The exposure device 210 communicates with other internal devices such as the delegate device 205, the approval device 215, and the eavesdropper device 230 over the institute network 280. The approval agent approves the institutes 115 decision to grant or deny the end-user agent's resource request. The approval device 215 makes requests for and accesses reports and documents that the chronicle platform 105 generates, such as updated resource memorandum. The approval device 215 communicates with the reviewer device 225 over the institute network 280. The reviewer agent reviews institutes 115 decisions granting or denying end-user agent requests using the reviewer device 215 to access reports such as the resource memorandum that the chronicle platform 105 generates. The reviewer device 215 communicates with other internal devices such as the eavesdropper device 230 over the institute network 280.

The eavesdropper agent audits transactions related to resource requests. The eavesdropper device 230 makes requests for and accesses reports and documents including the resource memorandum that the chronicle platform 205 generates. For instance, the eavesdropper device 230 audits the resource memorandum capture history associated with the resource request. The eavesdropper device in some cases communicates with the watchdog device 255 and the eavesdrop device 260 over the institute network 280. The eavesdropper device 230 communicates with all other internal devices over the institute network 280, including the deception device 220. The deception agent monitors transactions related to resource requests for fraudulent activity including an end-user inaccurately reporting revenue. The deception device 220 also makes requests for and accesses reports and documents, including the resource memorandum generated by the chronicle platform 105. The deception device 220 in some cases communicates with the watchdog device 255 and the eavesdrop device 260 over the institute network 280. The deception device 220 communicates with all other internal devices such as the representative device 235 over the institute network 280. The representative agent 235 works in the institutes 115 front offices to conduct in-person end-user transactions. The representative device 235 can access reports and documents including resource memorandum generated by the chronicle platform 105 over the institute network 280.

The institute network 280 connects the internal devices, the third-party devices, the institute server 240, the data services 180 and the enterprise service bus 270. The institute network 280 can include, for example, the Internet, an intranet, a secure network, a virtual private network, a local area network, a wide area network, or a wireless network. The institute network 280, for example, in some embodiment uses encrypted communications to securely transmit data. The institute network 280 also connects using standard or custom APIs in some embodiments. In most embodiments the institute network 280 will include a firewall to protect the institutes 115 from security access breaches.

The institute server 240 is a computing device connected to all internal and third-party devices, the data services 180, and the enterprise service bus 270 by the institute network 280. The institute server 240 manages, stores, sends, receives, and processes data for the institutes 115. For example, the institute server 240 can provide institutes 115 with around-the-clock file and network security, centralized data storage and shared resources, virus management and centralized back up processes. In addition, the institute 240 server can control access to the institute network 280 and other internal process and manages all user credentials. The institute server 240 also can provide the authentication interface to mobile and third-party devices using the Internet or other external network from outside of the institute network 280 firewall. Additionally, the institute server 240 can provide increased reliability so that there are no interruptions in the institute 115 workflow processes such as the resource request process The institute server 240 maintains a local database and performs all internal processes for the institute 115. The institute server 240 also controls all requests to the chronicle platform 105 and access to the integration framework 110 made by all internal and third-party devices through the enterprise service bus 270. For instance, the institute sever 240 directs the enterprise service bus 270 to send updated account data to the chronicle platform each day at a particular time. The institute server 240 also provides file security for the institute 115 by designating an authorization for each file such that only authorized agents can gain access to that file. For instance, the institute server 240 will not allow an eavesdrop agent access to the institute 115 employee personal information. The institute server 240 also provides the institute 115 with critical virus protection services to protect the institute 115 from a virus that a third-party device might introduce. The institute server 240 also provides the authentication interface to mobile devices using the Internet, or any other network, outside of the institute network 280 firewall.

The institute server 240 is a computing device connected to all internal and third-party devices, the data services 180, and the enterprise service bus 270 by the institute network 280. The institute server 240 manages, stores, sends, receives, and processes data for the institutes 115. For example, the institute server 240 provides institutes 115 with around-the-clock file and network security, centralized data storage and shared resources, virus management and centralized back up processes. In addition, the institute 240 server controls access to the institute network 280 and other internal process and manages all user credentials. The institute server 240 also provides the authentication interface to mobile and third-party devices using the Internet or other external network from outside of the institute network 280 firewall. Additionally, the institute server 240 provides increased reliability so that there are no interruptions in the institutes 115 workflow processes such as the resource request process The institute server 240 maintains a local database and performs all internal processes for the institutes 115. The institute server 240 also controls all requests to the chronicle platform 105 and access to the integration framework 110 made by all internal and third-party devices through the enterprise service bus 270. For instance, the institute sever 240 directs the enterprise service bus 270 to send updated account data to the chronicle platform each day at a particular time. The institute server 240 also provides file security for the institutes 115 by designating an authorization for each file such that only authorized agents can gain access to that file. For instance, the institute server 240 will not allow an eavesdrop agent access to the institutes 115 employee personal information. The institute server 240 also provides institutes 115 with critical virus protection services to protect the institutes 115 from a virus that a third-party device might introduce. The institute server 240 also provides the authentication interface to mobile devices using the Internet, or any other network, outside of the institute network 280 firewall.

Some institutes may further comprise an enterprise service bus 270. The enterprise service bus 270 is a second interface between both the institutes 115 and the data services 180 and the chronicle platform 105. The enterprise service bus 270 receives data in any variety of data formats from one or more sources including the data services 180. In some cases data services 180 push data to the enterprise service bus 270. Conversely, in other cases the enterprise service bus 270 pulls data from the data services 180. The enterprise service bus 270 receives data in real-time, in batches, or as updated data. The enterprise service bus 270 sends data to the chronicle platform in a predefined format acceptable by a data interface 365 and a user interface 320. The enterprise service bus 270 uses servers and databases to transform the data into other formats compatible with the chronicle platform 105. The enterprise service bus 270 sends the transformed date to the chronicle platform 105. The enterprise service bus 270 also transforms the date from the chronicle platform into the proper format for institutes 115. The enterprise service bus 270 also transforms data transmitted and received to and from the data services 180 into compatible formats as required. The enterprise service bus 270 distributes information across the institutes 115 quickly and easily, masks the hardware and networking differences among the devices using institutes 115, and integrates legacy processes and data to current workflows.

Figure 2B:
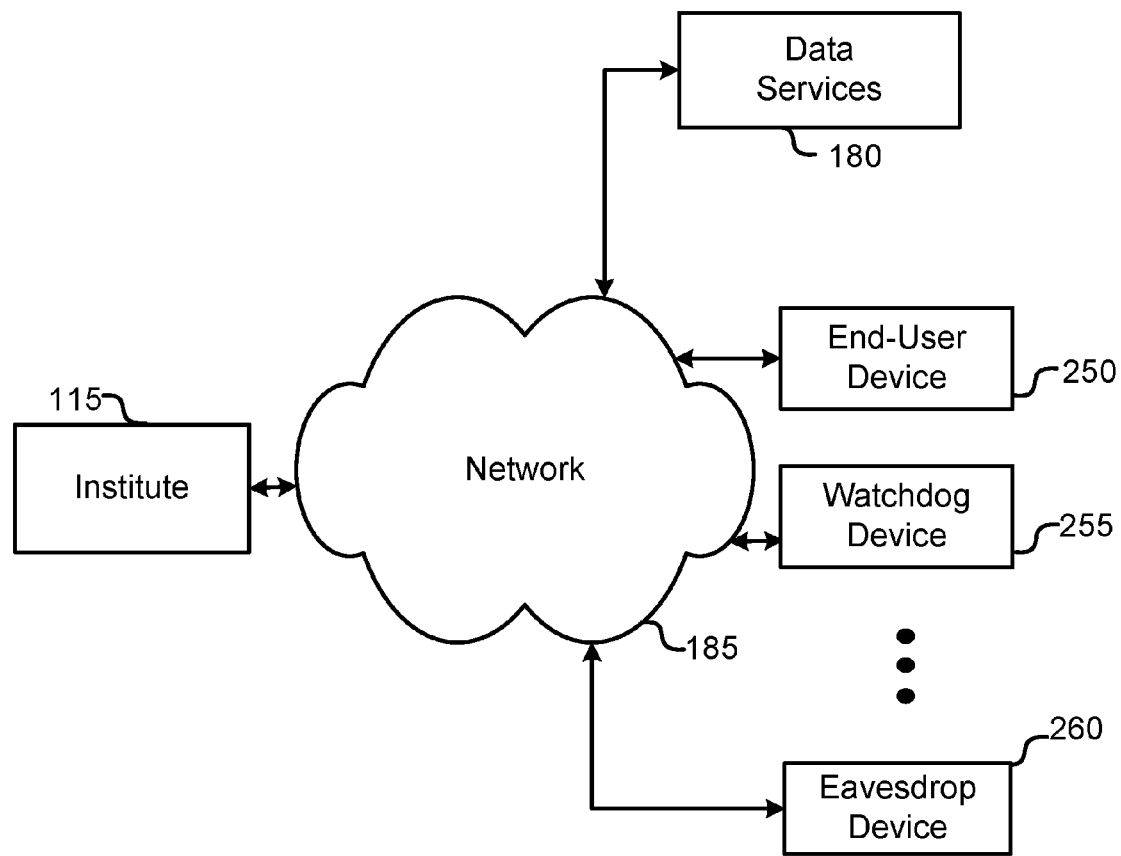
FIGS. 2B and 2C depict block diagrams of institutes communicating with other devices.

FIG. 2B depicts the institutes 115 (e.g., that includes an enterprise service bus, such as the enterprise service bus 270) in communication with data services 180, end user device 250, watchdog device 255 and eavesdrop device 260 over the network 185. An end-user agent is the resource requester. The end-user agent can be, for example, an individual or company requesting a home, personal, business or equipment loan or a treasury service. The end-user agent communicates directly with the delegate agent, for instance in person or by telephone. The end-user agent electronically communicates with institutes 115 using the end-user device 250 and sends content objects related to the resource request to delegate device 205 or the institute server 240. The end-user device 250 accesses reports and documents that the chronicle platform 105 generates over the network 185. The watchdog agent monitors transactions related to resource requests for regulatory violations. The watchdog device 255 accesses reports and documents generated by the chronicle platform 105 over the network 185. The eavesdrop agent eavesdrops transactions related to resource requests including the resource memorandum capture history. The eavesdrop device 260 accesses reports and documents including the resource memorandum generated by the chronicle platform 105.

Figure 2C:
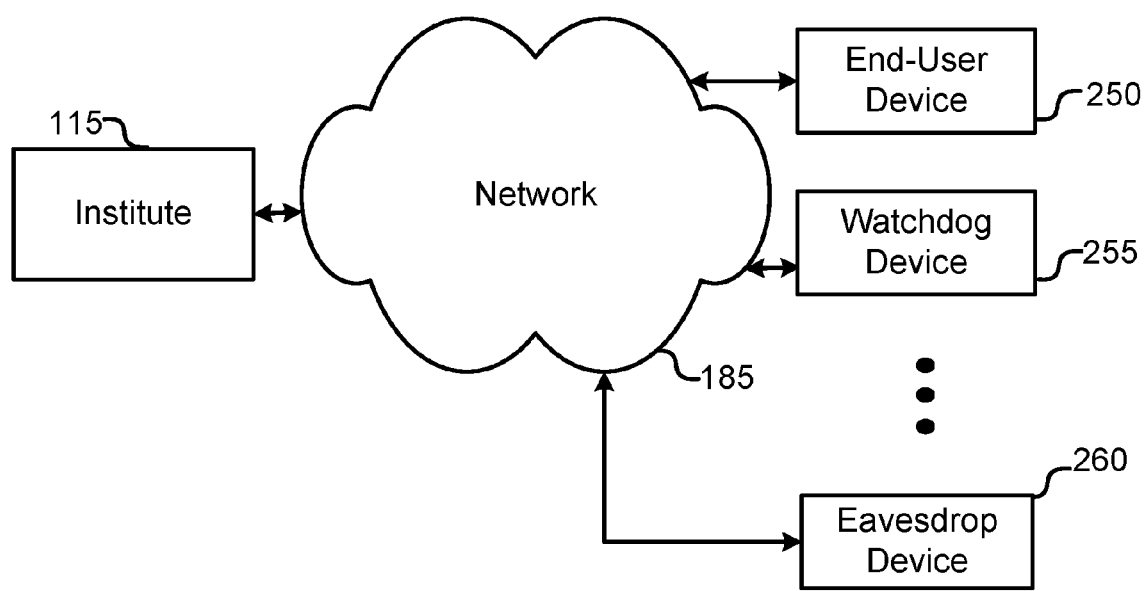

FIG. 2C depicts the institutes 115 (that need not include an enterprise service bus) that is not in direct communication with data services 180, as is shown in FIG. 2B, in communication with end user device 250, watchdog device 255 and eavesdrop device 260 over the network 185. In this embodiment, the integration framework 110 performs the data format transformations for institute 115 as well as interfaces with data services 180 for institutes 115.

Figure 3:
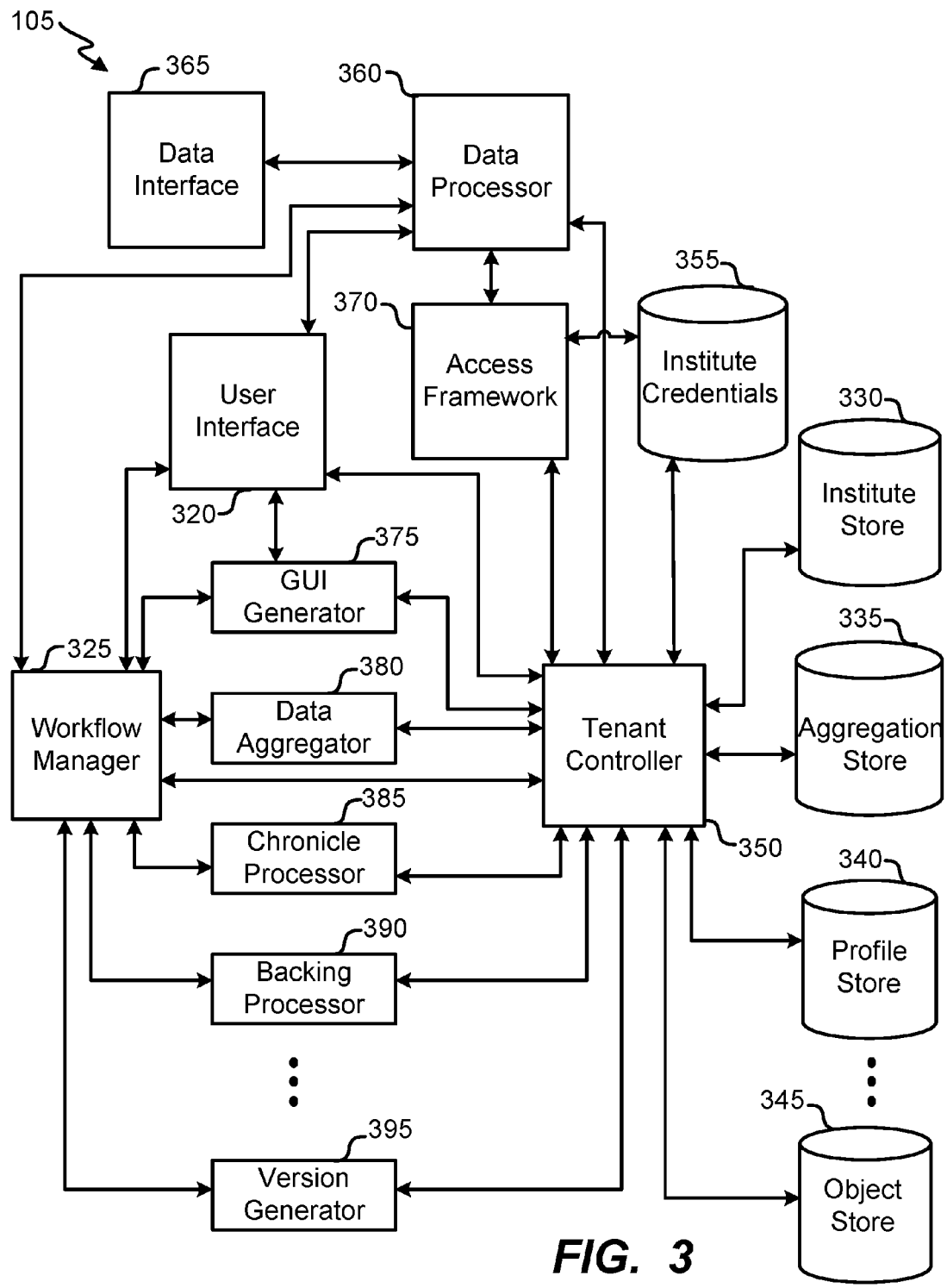
FIG. 3 depicts a block diagram of an embodiment of a chronicle platform.

FIG. 3 depicts the block diagram of an embodiment of the chronicle platform 105. The chronicle platform 105 is a tenant on the multitenant platform that the chronicle system 100 is built on. The chronicle platform 105 is the tenant that provides chronicle system 100 services to other tenants on the platform, specifically the institutes 115 tenants. The chronicle platform 105 communicates directly with the integration framework 110 and the institutes 115 through the data interface 365 and the user interface 320 over the network 185. The data interface 365 communicates using TCP/IP (transmission control protocol/internet protocol) with the integration framework 205 over the network 185. The data interface 365 uses HTTP(s) requests and responses. The data interface 365 transmits and receives data in JSON and XML formats embedded in the HTTP(s) requests and responses. For example, the data interface 365 uses the Salesforce™ Bulk API and makes an HTTP(S) request for large data files from institutes 115 and then receives them with the data embedded in JSON or XML formats in an HTTP(s) response from the integration framework 110. In another example the data interface 365 sends HTTP(s) requests to document service 175 with resource request data embedded in XML format. The data interface 365 also uses HTTP(S) web service calls to request and receive data. For example, the data interface 365 sends HTTP(s) web service requests to retrieve data from pricing service 130, identification service 155, and extension service 135.

The user interface 320 receives and transmits requests and responses between the institute 115 devices and the chronicle platform 105 over the network 185 using the enterprise service bus 270 or the integration framework 110. The user interface 320 uses HTTP(s) web service connections in addition to JSON and XML formats embedded in the HTTP(s) requests and responses to communicate and send and receive data between the chronicle platform 105 over the network 185 and to the institute 115 devices by way of the integration platform 110 or the enterprise service bus 270. The user interface 320 transmits presentation data generated by the GUI generator 375 to the institute 115 devices using HTTP(s) web services. While described separately here, both the user interface 320 and the data interface 365 can be combined as a single interface or can be hosted on a single processor. In other embodiments the user interface 320 and the data interface 365 also use any form of network communication protocols not described here.

A data processor 360 filters the credential and permission information from incoming HTTP(s) requests and responses from data interface 365 and user interface 320 and sends them to an access framework 370 to determine if the requests and responses are from a verified source. The data processor 360 stops processing the HTTP(s) request or response if the access framework 370 does not verify the source. The data processor 360 extracts the embedded data from the response. The data processor 360 then sends the extracted data to a tenant controller 350 and transmits the filtered response to a workflow manager 325. For instance, when the chronicle platform 105 makes an HTTP(s) request for an extension report from the integration framework 110: the integration framework 110 returns an HTTP(s) response with the extension data requested embedded in the HTTP(s) response; the data processor 360 filters the HTTP(s) response and sends the credential and permission information to the access manager 370; the access manager verifies the source; the data processor 360 then extracts the extension data and sends it to the tenant controller 350; and the data processor 360 sends the filtered response to the workflow manager 325.

As another example, the data processor 360 can detect a type of content object having been uploaded or otherwise provide (e.g., via a file extension, file name, corresponding data value, and/or object analysis). In one exemplary instance, identifying a type of content object can include identifying a content-object bucket, as described in U.S. application Ser. No. 13/673,638, which is hereby incorporated by reference in its entirety for all purposes. The data processor 360 can further identify one or more indices associated with the object. An index can be identified, for example, based on object analysis (e.g., to identify a field and extract a value for that field), an analysis of data in a communication received (e.g., by detecting an identifier of a device having transmitted the communication) and/or an interface provided to support provision of the object and/or a selection input. An index can correspond to, for example, a device, a workflow iteration, a request, time period or an entity.

The data processor 360 can, in some instances, process content objects (e.g., prior to or after storage). The processing can include, for example, detecting whether the content object includes required data (e.g., whether any value for a required field has been provided or whether a particular type of value has been provided, where a value may be numeric, textual or of another format); detecting whether the content object is of a defined and appropriate type or format; and/or detecting whether the content object includes particular types of and/or values of metadata (e.g., to determine whether a particular type of access to the object has occurred). Processing a content object can include extracting and/or analyzing data (e.g., a value for a field) from the content object. Analysis of the data can include, for example, applying a conversion protocol, evaluating a condition and/or generating a new metric based on the data.

The data processor 360 can update a data store to reflect and/or include a processing result (e.g., in association with an index and/or content object identifier). The processing result can include, for example, an indication that a particular type of processing has occurred, a date and/or time of processing, a numeric result, a category result (e.g., identifying whether particular data exists or an acceptability of data), and/or a text result. In some instances, the data processor 360 detects a result of an external processing of a content object (e.g., via the data interface 365). For example, a communication from a client device may identify a result of a review (e.g., by a client) of a content object. The data processor 360 can then update a data store to include the result, indicate that processing had occurred, identify a device or entity associated with the processing, etc.

Various processing can further facilitate, cause or trigger a status associated with a content object to change. The workflow manager 325 can manage statuses. In some instances, an object-associated status includes a status of a content object. In some instances, an object-associated status includes a status of a bucket configured to receive a content object. Thus, for example, for a particular type of content object associated with a given index, a status be any of empty (e.g., not received and/or stored), full, finalized, edited, reviewed or approved.

The workflow manager 325 can, in some instances, implement one or more workflow rules (stored in a workflow rules data store). Implementing a workflow can include, for example, querying an object structure and/or processing one or more content objects. Workflow rules can be, for example, partly or fully defined by a client, based on a learning algorithm (e.g., to maximize or optimize a variable). A workflow rule can define a plurality of states within the workflow and/or progression criteria for passing between particular states. The plurality of states can be defined to preclude or allow for a workflow iteration to be within multiple states at once. The plurality of states can include or can have a sequential arrangement, such that an iteration is inhibited from returning from a late-sequence state to an early-sequence state and/or such that all (or a defined quantity) of progression criteria associated with early-sequence state transitions are to be satisfied before arriving at a late-sequence state. A workflow rule can also or alternatively include or have a hierarchical arrangement. For example, multiple low-level states may be provided under a given high-level state. Each low-level state may be associated with, for example, different content objects, different indices and/or different entity assignments.

When the workflow manager 325 is ready to send an HTTP(s) request or a response, it transmits instructions to the data processor 360. The data processor 360 interprets the instructions from the workflow manager 325, retrieves data from the tenant controller 350 if so instructed, compiles the HTTP(s) request or response, and transmits the compiled HTTP(s) request or response to the data interface 365. For instance, when the workflow manager 325 determines that a loan memorandum is ready to be transmitted to institutes 115: workflow manager 325 sends instructions to the data processor 360 to retrieve the resource memorandum data from the tenant controller 350 along with general delivery instructions; the data processor 360 retrieves the resource memorandum data from the tenant controller 350 and complies the HTTP(s) response; and the data processor 360 transmits the compiled HTTP(s) response to the data interface 365. At the same time the workflow manager 325 sends instructions to the GUI generator 375 to create a presentation for the institutes 115 devices and instructs the data processor 360 to transmit that presentation to the user interface 320.

The workflow manager 325 manages the processes and interactions in the chronicle platform 105. The workflow manager 325 receives filtered requests and responses from the data processor 360 and parses and interprets them to determine which of the GUI generator 375, the data aggregator 380, the chronicle processor 385, the backing processor 390, and the version generator 395 processes to initiate and control in response to the requests and responses. The workflow manager 325 also receives triggers from the chronicle platform 105 itself that indicate an event has occurred that requires further processing. The workflow manager 325 then initiates the processes, manages the processes to the end, and controls and coordinates interactions among processes.

For instance, when the institutes 115 request or a triggering event to capture the current version of the resource memorandum occurs, the workflow manager 325: instructs the tenant controller 350 to retrieve the correct data and send it to a version generator 395; starts the version generator 395; waits for the version generator 395 to capture the version; instructs the version generator 395 to send the result to the tenant controller 350; instructs the tenant controller 350 to retrieve data and send it to the chronicle processor 385; starts the chronicle processer 385; waits for the chronicle processor 385 to finish; instructs the chronicle processor 385 to send the result to the tenant controller 350; instructs the tenant controller 350 to retrieve data and send it to a GUI processor 375; instructs the GUI processor to generate a browser viewable form of the captured resource memorandum; waits for the GUI processor 375 to finish; instructs the GUI processor 375 to send the result to the tenant controller 350; instructs the tenant controller 350 to retrieve data and send it to the data processor 360; and then instructs the data processor 360 to generate an HTTP(s) response that contains a presentation of the event that triggered the version generator 395 to capture the current versions of the resource memorandum.

The workflow manager 325 identifies the workflow progression for any process on the chronicle platform 105. The workflow manager 325 initiates each of the GUI generator 375, the data aggregator 380, the chronicle processor 385, the backing processor 390, and the version generator 395 simultaneously or successively or both. For instance, the workflow manager 325 can initiate the version generator 395 to capture a version of the resource memorandum while concurrently initiating the GUI generator 375 to create a presentation to report on the event that triggered capturing the version of the resource memorandum. Conversely, if the workflow to respond to the event that triggered capturing the version of the resource memorandum also required that the chronicle platform 105 return a copy of the version of the resource request, in that case the workflow manager 325 would initiate the version generator 395 and the GUI generator 375 successively.

The access framework 370 controls access to the chronicle platform 105. The access framework 370 receives credentials and permissions from incoming HTTP(s) requests and responses; retrieves credentials and permissions from an institute credentials 355; and verifies that the credentials and permissions match or validates them in any number of ways. The access framework 370 also retrieves credentials permissions from the institute credentials 355 and sends them to the tenant controller 350 for the data processor 360 to embed them into the HTTP(s) requests and responses that the data interface 365 sends to the integration framework 110 or the institutes 115.

The access framework 370 manages permissions based on inputs. For example, a user having requested a resource can specify permissions pertaining to the request. The permissions can indicate that one or more other users or agents are permitted to access select or all data pertaining to the request. Permissions may, but need not, be time-limited, which may include limiting access permission to (for example) a particular period of absolute time (e.g., date range) or a period of time with a beginning or end defined by a given event (e.g., detection of a content object or progression to a new state in a workflow). As one illustration, a requestor device may identify one or more agents via corresponding email addresses to indicate that each of the one or more agent is permitted to access data being collected and submitted for the request. Should any of these identifiers subsequently be received from a device as a form of identification, the access framework 370 may determine that data pertaining to the request (e.g., previously collected data, analysis of previously collected data and/or specifications of data that still is to be collected) can be transmitted to the device.

Permissions may, but need not, be tied to task delegation. In one instance, delegating a task pertaining to a request to a given agent has an effect of also granting access permission (e.g., to task-specific data and/or request-specific data) to the agent. The access permission may include (for example) a read-access and/or an access that permits uploading, data entry, and/or data editing. A task that is delegated may include, e.g., providing a particular type of content object or a particular type of data (e.g., corresponding to a given field).

The tenant controller 350 retrieves and stores data used by all of the processes on the chronicle platform 105. The tenant controller 350 is connected to all storage media and all processors on the chronicle platform. The workflow manager 325 instructs the tenant controller 350 when to retrieve data and where to send it. For instance, when the workflow manager 325 is ready to initiate the chronicle processor 385 to complete a workflow, it instructs the tenant controller 350 to retrieve all of the data required to process the workflow and to send it to the chronicle processor 385. The workflow manager 325 instructs the chronicle processor 385 to send the result to the tenant controller 350 when it has completed processing.

The institute credentials 355 stores institutes 115 credentials and permissions. An institute store 330 stores data specific to each of the institutes 115 and its end-users. The data may include, for example, agent-identifying information (e.g., email addresses), credentials of one or more agents, and/or associations between each of one or more agents and one or more requests.

An aggregator store 335 stores results from a data aggregator 380. A profile store 340 and an object store 345 store data local to the chronicle platform 105. Although depicted as separate storage in FIG. 3, the institute credentials 355, the institute store 330, the aggregator store 335, the profile store 340 and object store 345 are implemented in one or more storage devices in other embodiments.

The GUI generator 375 generates the graphical user interface presentations that the chronicle platform 105 sends through the integration framework 110 or the enterprise service bus 270 to the agent that sent an HTTP(s) request or response to the chronicle platform 105. The workflow manager 325 starts the GUI generator 375 after instructing the tenant controller 350 to retrieve and send data to the GUI generator 375. The institutes 115 may each have any number of graphical user interface format requirements. For instance the GUI generator 375 will generate different graphical user interfaces for a tablet than for a smart phone and yet another for a laptop computer. The workflow manager 325 passes the GUI generator 375 the necessary format instruction in some circumstances and in other circumstances the tenant controller 350 sends the format instruction.

The data aggregator 380 aggregates data from any number of sources that is relevant to processing the resource request. In one example the data aggregator 380 collects data (e.g., pertaining to multiple requests) from many tenants on the multitenant platform. The data aggregator 380 then strips all confidential and personal information from the data it receives from the many tenants so that all tenants can access the aggregated data. The data aggregator 380 groups like data and performs any number of statistical analyses on that data. For example, the data aggregator 380 computes the average annual income of every end-user resource requester for all tenants. The data aggregator 380 also aggregates entities and actions related to the resource request. For instance, the data aggregator 380 can aggregate all family members that own a property they are trying to mortgage.

The data aggregator 380 can aggregate their annual income, their indebtedness, and other factors critical for the institutes 115 to qualify the resource request. The chronicle processor 390 uses the data aggregator 380 result to process chronicles and update the resource memorandum, in some cases.

The chronicle processor 390 manages interactions and information associated with the resource request. The chronicle processor 390 creates a chronicle for each resource request and populates the chronicle with content objects related to the resource request. The chronicle processor 390 manages all of the documents related to the resource request. The chronicle processor 390 tracks a status of document provision, such that—for a particular request—it can be determined (for example) which content objects have been received, completed, reviewed and/or finalized and/or which content objects still may be or must be received, completed, reviewed and/or finalized for full processing of the request. The chronicle processor 390 processes the content objects in the chronicle to generate and update the resource memorandum and other reports related to the resource request. For example, the chronicle processor 390 computes the spread of the interest rate used to fulfill a resource request. The chronicle processor 390 uses the content objects from the data services 180 to populate the chronicle with data used to qualify the resource request—for example—a resource request for a home loan, business loan, or vehicle loan.

The chronicle processor 390 creates a trigger that the workflow manager 325 detects and processes when predetermined events occur. For instance, when the chronicle processor 390 fills a chronicle with all of the content objects required to establish the qualification profile of the resource requester, the chronicle processor 390 creates the trigger that workflow manager 325 detects and then, once detected, initiates the workflow for capturing a version of the resource memorandum. As another example, the chronicle processor 390 creates a trigger that a delegated task has not been completed by a particular time. An alert may then be generated (e.g., to be presented via the GUI generator 375) or the task may automatically be re-delegated.

The workflow manger 325 also initiates the GUI generator 375 to generate a presentation for the institutes 115 agent to signify that the documents required to qualify the resource request are complete, and as such, the resource requester's qualification profile is ready for the institutes 115 agent to evaluate. The chronicle processor 390 is workflow driven by the workflow manager 325 that instructs the chronicle processor 390 how to progress through processing a chronicle based on any number of events occurring externally to the chronicle platform 105 as well as events occurring in the chronicle platform 105.

The resource memorandum is updated numerous times while chronicle system 100 is processing the resource request. For instance it is updated when extension service 135 sends a credit report or when the end-user device 250 uploads a paycheck stub or tax return. The version generator 395 captures versions of the resource memorandum at different points during the resource request processing that the eavesdropper device 230, the watchdog device 255, and the eavesdrop device 260 can audit. In some circumstances, the version generator 395 captures the version of the resource memorandum at the request of the institutes 115. As one example, a delegate device 205 makes a request to the chronicle platform 105 to capture the version of the resource memorandum before sending the resource memorandum to the reviewer device 225 for review. The version generator 395 also automatically captures the version of the resource memorandum based on triggering criteria generated by the workflow internal to the chronicle platform 105, and on such other triggers as the passage of time. For example, the workflow manager 325 detects the trigger sent by the chronicle processor 390 when it received the data from the credit report in the example above and initiates the version generator 395 to capture the version of the resource memorandum. The workflow manager 325 also instructs the version generator 395, to capture the version of the resource memorandum every 90 days.

Once the version is captured the version generator 395 also creates a new version of the resource memorandum as dictated by instructions from the workflow manager 325, in some cases, and the new version of the resource memorandum becomes the active resource memorandum used by all parties to continue processing the resource request. According to the workflow instructions generated by the workflow manager 325, the version generator 395 forwards a copy of the captured version of the resource request for further processing, for instance, to the reviewer device 225. And if the instructions from the workflow manager so indicate, the version generator 395 forwards the new version of the resource memorandum to designated devices, such as the delegate device 205. After the version generator 395 captures the version of the resource memorandum it prevents further modification to the captured version in any number of ways. In some cases, the version generator 395 converts an editable document to one that is read-only—for instance the version generator 395 converts a Word document to a PDF document. The version generator 395 can also prevent further modification by write-protect protecting the captured version of the resource memorandum using any number of secure file storage processes and/or protocols either as s PDF file or any other, for instance, JSON or XML, data corresponding to fields in the resource memorandum. In the case where the eavesdropper device 230 makes a request to audit the resource memorandum capture history, the chronicle platform 105 retrieves the resource memorandum capture history so that the eavesdropper device 230 can review it.

The backing processor 390 processes collateral related to the resource request. The backing processor 390 calculates for each piece of collateral such values as, for example, percent ownership, percent and length of indebtedness, relative relationship to the resource requester, and annual revenue or losses it generates.

Figure 4:
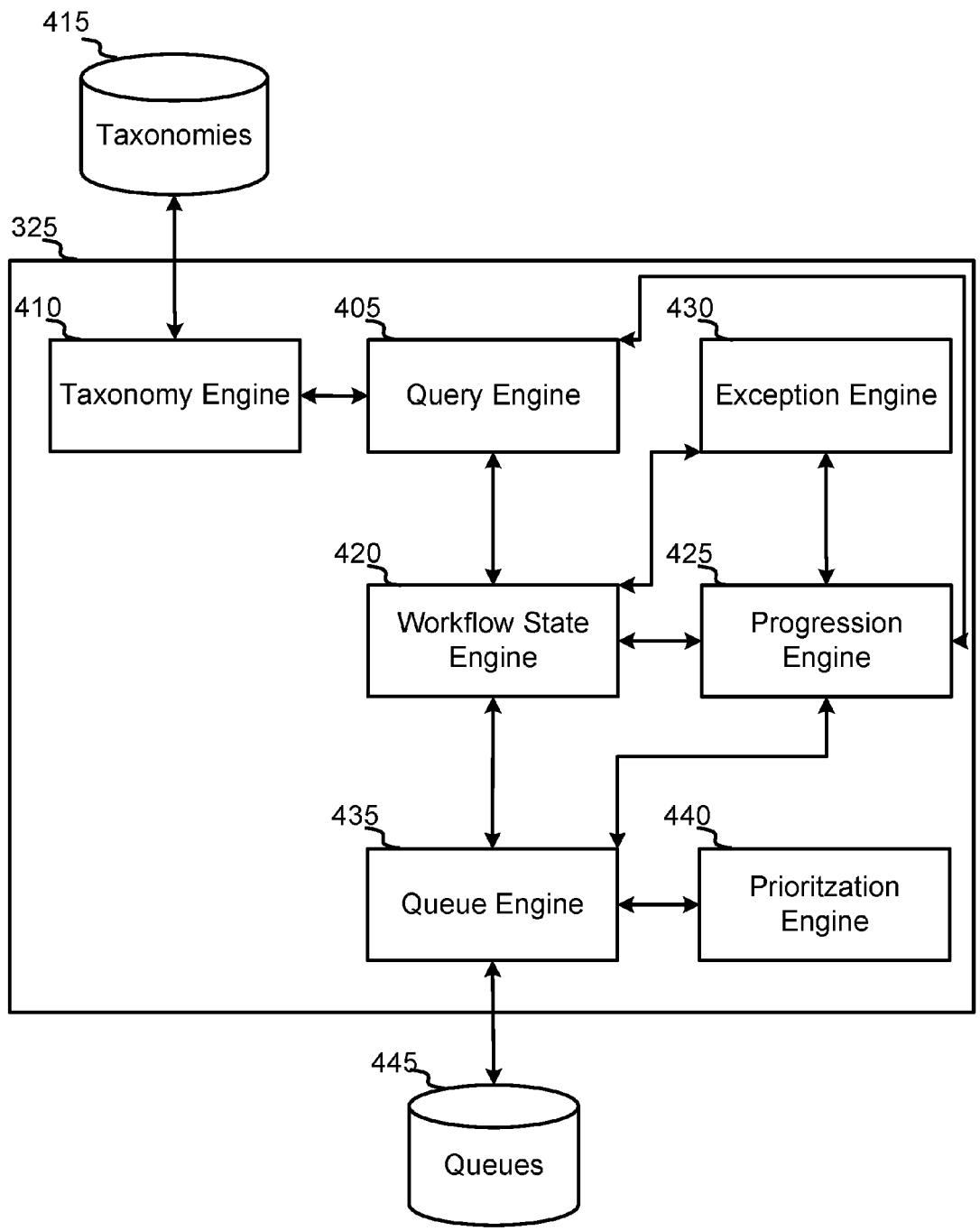
FIG. 4 depicts a block diagram of an embodiment of a workflow manager.

FIG. 4 shows a block diagram of an embodiment of the workflow manager 325. A query engine 405 can identify one or more query variables that correspond to, e.g., one or more indices. The one or more indices can correspond to (for example) an iteration of a workflow, a request, a client, a user, a time period and/or a service. A query can be structured, for example, to determine which content objects associated with the one or more indices, a status of one or more content objects associated with the one or more indices, a processing result determined based on or associated with one or more content objects associated with the one or more indices, or other data (e.g., metadata) associated with one or more content objects associated with the one or more indices (e.g., upload time and/or entity). Accordingly, for example, a result of a query may indicate whether each of a set of content object types (e.g., defined in a workflow rule and/or query) are stored in a content object data store and/or have been processed in a specified manner. The query engine 405 can further query an object structure or another data store to identify data pertaining to a workflow iteration. For example, the query can be structured to identify a deadline or expected date for a particular state progression and/or for one or more intermediate iteration results (e.g., a predicted result based on available data).

In some instances, the query engine 405 can perform a query for content-object data. For example, the query can include querying for a particular field, any value of a particular field, a particular field value, one or more keywords, a string and/or a number exceeding a threshold. Such query can be constrained to one within a particular content object (e.g., having a specified type and being associated with one or more particular indices); a set of content objects (e.g., those associated with one or more indices, such as those associated with a workflow iteration) or all content objects. Performing such a query can include, for example, extracting a value from a content object. A value can be, for example, numeric, a string, alphanumeric or a category. The value can be one that matches or otherwise corresponds to a query and/or one that corresponds to a specified field.

A value corresponding to a field can be identified using a variety of techniques. For example, a content object may be configured so as to include values of particular fields at defined locations (e.g., defined list elements, table cells or positions within a document). As another example, an object can include an identifier of a field (e.g., text within a document or metadata associated with particular object data), and a defined relationship can relate a location of the field identifier to a location of a value for the field (e.g., the value is to be within the same row as the field identifier or the value is one having metadata including the field identifier). In some instances, to identify a field and/or a field value, individual values within a content object are detected and compared against a query term. For example, a document may be searched for a word that matches a field of interest.

In some instances, content objects can accord with a defined format. Thus, for example, fields may be consistently identified across content objects and/or values for a given field can be consistently located. In some instances, the format is less consistent, which can result in more variability in terms of field value locations and overall object characteristics corresponding to a given object type. Accordingly, the workflow manager 325 can include a taxonomy engine 410 that can use one or more taxonomies (having definitions stored in a taxonomy data store 415) to identify fields, field values and/or content object types. For example, a taxonomy can identify a set of content-object types (e.g., by name, identifier, file type, metadata or source) that are to be equated to a same object type. A taxonomy can further or alternatively identify a set of characteristics (e.g., terms, inter-object locations or metadata) that are to correspond to a same field.

A workflow state engine 420 can identify a state of a particular iteration of a workflow based on a result of a query performed by the query engine 405 and based on a workflow rule. For example, a state can be determined based on which content objects associated with one or more indices have been received, processed in a particular manner and/or associated with one or more defined processing results. In some instances, a state further depends on one or more other factors, such as how long an iteration has been pending or a time since a previous state progression.

As part of determining a workflow state, the workflow state engine 420 may identify a status of one or more content objects and/or content object buckets. For example, the workflow state engine 420 can determine whether a bucket associated with a workflow index and content object type is empty (indicating that it has not been received), full and/or processed (e.g., reviewed).

Determining a state can include, for example, identifying a lowest state within a sequence for which a corresponding progression criterion (to progress to a next state) has not been met, identifying all states within an arrangement (e.g., hierarchy and/or sequence) for which a progression criterion (to progress to a next state) has not been met and/or identifying a lowest state for which a state definition or previous progression criterion (to progress to the state from a prior state) has been met.

A progression engine 425 can evaluate each of one or more progression criteria associated with a workflow. For example, the progression engine 425 can determine whether a particular type of content object associated with one or more indices is stored in a content object data store and/or has been detected; whether a particular processing result (e.g., associated with a single content object or based on a collection of content objects) has been detected; and/or whether a particular input has been received in association with an index or content object (e.g., reflecting a review result, such as approval or denial or reflecting an indication as to whether a state is to progress). Progression criteria can be evaluated, for example, based on statuses of various content objects or content-object buckets; field values; processing results; data in an object structure and/or metadata.

Progression criteria may be fixed and/or dependent on one or more factors. For example, a particular type of content object may be conditionally required for a state transition when a particular field value exceeds a threshold.

Progression criteria can be evaluated, for example, at defined times, upon detecting a particular interaction with an interface or upon detecting a change corresponding to a content object or object structure. Upon detecting a new progression criteria satisfaction, progression engine 325 can trigger a state change via the workflow state engine 420.

An exception engine 430 can generate and/or implement one or more exceptions to state definitions and/or progression criteria. An exception can be generated in response to input received at an interface (e.g., from a client device, user device and/or entity authorized to define such an exception) identifying an exception to be used for one or more indices (e.g., removing a part of a progression criteria, such as not requiring a particular content object type).

Based on the exception, the workflow state engine 420 may generate a modified state definition and/or the progression engine 425 may generate a modified progression criterion. The modified state definition and/or progression criterion can include one that is relaxed as compared to an unmodified definition and/or criterion (e.g., does not require a given content object, processing, processing result or input).

The exception, modified state definition and/or modified progression criterion can be applicable (e.g., for one or more defined indices) indefinitely or for a defined duration. The defined duration can include a defined temporal interval or a functional condition. For example, an exception can apply to a progression between two states (e.g., states #2-3) until an iteration reaches a defined state (e.g., state #5), until or unless a particular processing result has been received and/or until a particular input has been detected (e.g., removing the exception).

A queue engine 435 can generate one or more action items based on a workflow rule. An action item can correspond to a state definition and/or progression criterion. In one instance, an action item is one that facilitates satisfaction of a progression criterion. For example, if a progression criterion includes provision of a particular type of content object, an action item can include collecting a content object of the particular type. As another example, if a progression criterion includes performing a specified type of analysis or review of a given content object, the action item can include such performance.

In some instances, an action item relates to a progression criteria for progressing from a current state to a next state within a sequence. In some instances, an action item relates to a progression criteria for progressing between two non-current states (e.g., subsequent to a current one in a sequence). For example, a workflow iteration may be at State #6, and an action item may pertain to a progression criterion for progressing (e.g., from State #7) to State #8.

Each action item can be associated with a deadline, an assignee (e.g., entity that is to handle the item) and/or a complexity (e.g., relating to an estimated time required for completing the item, which may be estimated based on a learning algorithm and past item-performance data).

In some instances, a single action item is generated (e.g., per workflow iteration, per index and/or per assignee). In some instances, multiple action items are generated. A prioritization engine 340 may then prioritize the action items so as to filter the action items, define spatial order for representations of the action items and/or define a temporal order for representations of the action items.

The prioritization can be based on, for example, a current state, such that action items that contribute to more imminent progressions within a workflow are prioritized over others associated with more distant progressions. Prioritizations can also or alternatively be based on estimated times to complete a work item, inputs received from an entity (e.g., user or client) relating to prioritization, action-item deadlines and/or whether an action item is one that may be subject to an exception (or whether a workflow rule prohibits such an exception). A prioritization can include, for example, a ranking (e.g., relative to other action items), a priority score, or a deadline.

The queue engine 435 may then use the prioritization(s) to, e.g., select a subset of a set of action items (e.g., having a relative or absolute prioritization exceeding a threshold). For example, the subset can include all action items with a prioritization score above a defined value or the action items within a set having the three highest prioritization scores across the set. The queue engine 435 may further or alternatively use the prioritization(s) to order the action items of a subset or set (e.g., according to the prioritizations).

The queue engine 435 can generate a queue (e.g., for a given workflow iteration, index and/or assignee), which can be stored in a queue data store 445. A queue can be ordered (e.g., according to prioritizations) or unordered. In some instances, a queue can include a filtered subset of a set of action items. A queue can be dynamic. For example, the queue engine 435 can communicate with other engines to detect whether particular actions have been completed or identified as having been completed. The queue engine 435 can then update the queue to remove completed queue item(s). Similarly, the queue engine 435 can communicate with other engines to determine whether one or more new action items are appropriate (e.g., based on a state progression or processing result), in which case a new item can be generated and added to the queue.

A notification of each new action item may then be generated and presented. The notification can include or can be included within, for example, a list, a table, text, a webpage, an app page, a message and/or an email. Action item identifications can be present according to an order (as corresponding to an order in a queue) in the notification. Each of one or more action items can further be accompanied by a tool to facilitate performance of an item (e.g., to upload, review, edit, annotate or otherwise process a content object). The notification can identify one or more workflows, request, indices, assignees or other variables pertaining to the action item(s). The notification can identify a priority and/or deadline for completing an action item and/or a processing and state-progressing result of completing or not completing the action item (e.g., generally or by a defined deadline).

In some instances, a notification further includes an option to initiate an exception in correspondence to an action item. For example, a notification can identify a set of action items assigned to a user and may allow a client to provide input identifying that a particular action item is not required (or not required until a particular circumstance arises).

The notification can further identify one or more states in a workflow, a current state, part or all of a progression criterion (e.g., from a current state to a next state), a next state and/or a status of one or more content objects and/or content-object buckets. In some instances, a notification can identify one or more action items from each of multiple queues (e.g., associated with different assignees). Such additional queue(s) can be indicative to a progress of a workflow iteration.

A presentation and/or transmission of the notification at or to, for example, a client or user device. Such presentation and/or transmission can occur, for example, at a routine time or time interval, upon detecting a change a queue or notification, upon detecting a state change or upon receiving a request for such data (or for a status update).

Figure 5:
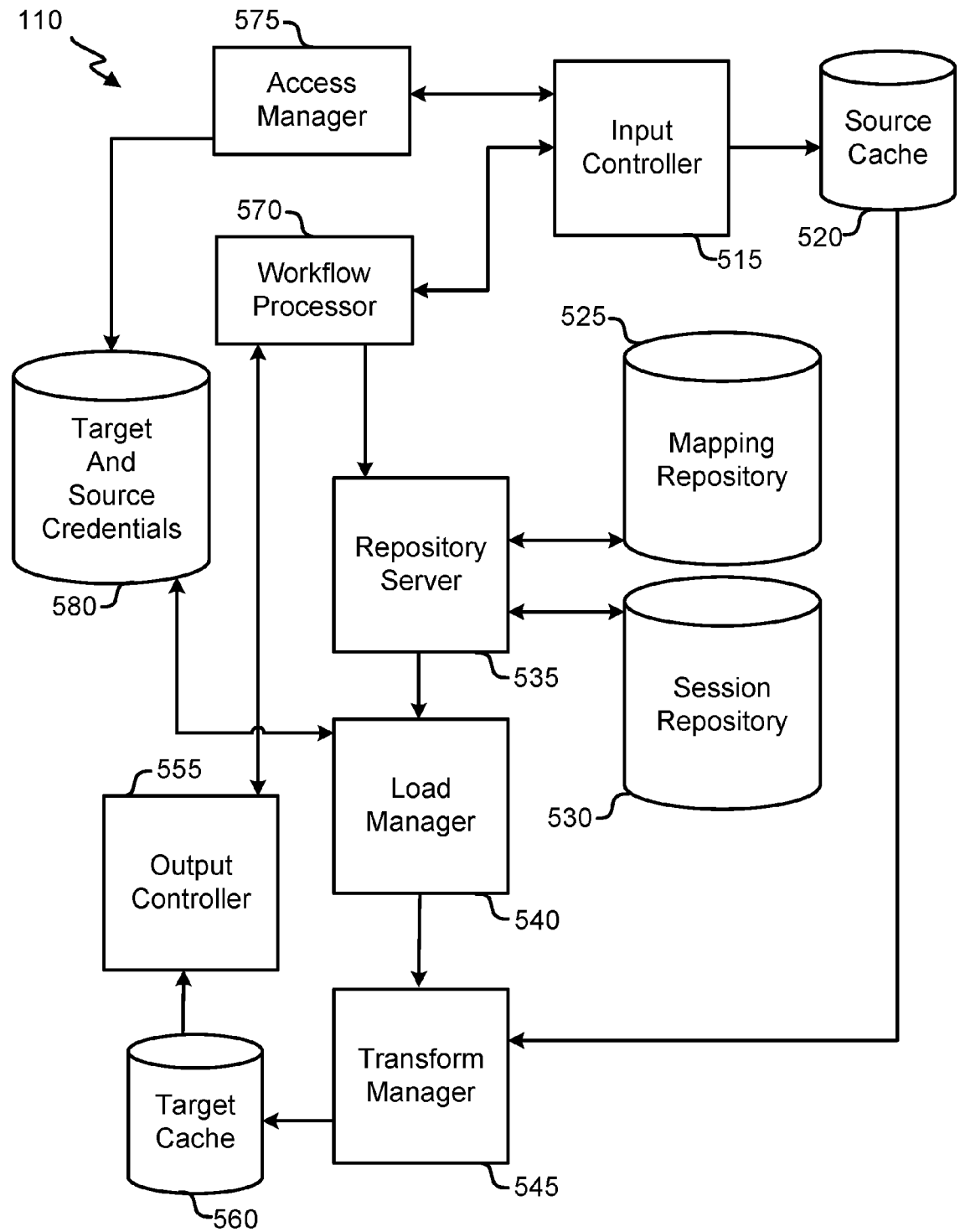
FIG. 5 depicts a block diagram of an embodiment of an integration framework.

FIG. 5 depicts the block diagram of an embodiment of the integration framework 110. The integration framework 110 is also a tenant on the multitenant platform the chronicle system 100 is built on. The integration framework 110 provides services to the chronicle platform 105 tenant and the institutes 115 tenants. The integration framework 110 is the first interface between both the data services 180 and the institutes 115 and the chronicle platform 105. The integration framework 110 therefore receives and sends HTTP(s) requests and responses to the institutes 115, the data services 180, and the chronicle platform 105. The integration platform 110 transforms embedded data in HTTP(s) requests and responses from a source data format of the requester or responder into a target data format for the intended recipient.

An access manager 575 controls input access to the integration platform 110. The access manager uses any known source of access authorization to align credentials of the input data to a target and source credentials 580. For instance, the access manager compares the input data credential to the corresponding credential in the target and source credential 580 and allows processing to continue if they match. In other cases, an encryption code from the target and source credentials 580 is used with the input data encryption key to decrypt the input data.

The input controller 515 receives and filters HTTP(s) requests and responses from the institutes 115, the data services 280, and the chronicle platform 105. The input controller 515 stores the data from the HTTP(s) requests and responses in a source cache 520 and waits until all data to be transformed is received and stored in source cache 520. The input controller 515 then sends the filtered response to a workflow processor 570 once all data is cached and ready to be transformed. For instance, when the extension service 135 sends an HTTP(s) response containing embedded extension data, the input controller 515 filters the HTTP(s) response to strip the embedded extension data, stores the data, checks to makes sure the data is complete, and sends the filtered response to workflow processor 570.

The workflow processor 570 manages all processes and interactions in the integration framework 110. The workflow processor 570 receives filtered requests and responses from the input controller 515. The workflow processor 570 calculates the mapping index and the session index necessary to transform the source data format to the target data format. The workflow processor 570 starts the process of transforming source data formats to target data formats by instructing a repository server 535 to retrieve mapping and session data relating the source data format to the target data format. The repository server 535 retrieves the mapping and session data and passes it to a load manager 540. The mapping maps the source data format to the target data format. The session is a set of instructions that describe how and when to transform the source data format to the target data format.

The load manager 540 validates the source and target by accessing the target and source credential 580 and only continues the process of transforming the data if there is proper validation. The load manager 540 triggers a transform manager 545 to transform the source data format to the target data format using the mapping and the session. For instance, when a source sends data in CSV format and the target requires the data in a text file, the session instructs the transform manager 545 how and when to convert from CVS to text and the transform manager 545 uses the mapping to map CVS fields to text fields. The transform manager 545 sends transformed data to a target cache 560 until all data is transformed. Once the target cache 560 contains all of the transformed data, an output controller 555 embeds the transformed data into an HTTP(s) response or request. In some cases, for example, the output controller 555 embeds the data using JSON or XML. The output controller 555 sends the HTTP(s) response to the target.

Figure 6:
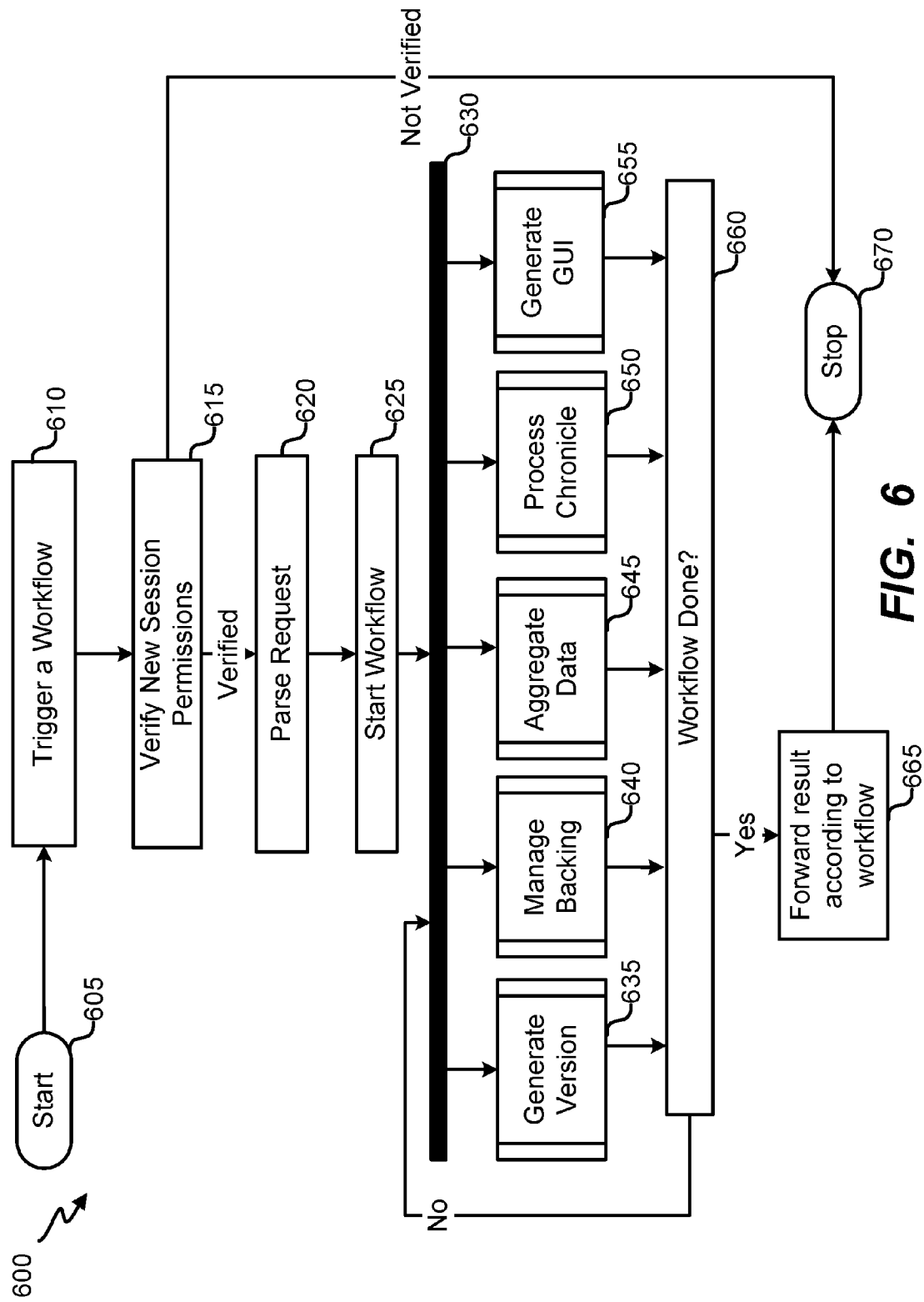
FIG. 6 illustrates a flowchart of an embodiment of a process for processing a resource request.

FIG. 6 illustrates a flowchart of an embodiment of a process 600 for processing the resource request in the chronicle platform 105. The process starts at block 605 when an event triggers a first workflow as shown in block 610. Any number of events occurring internal to the chronicle platform 105 and external to the chronicle platform 105 can trigger the first workflow in any number of ways. Each of the GUI generator 375, the data aggregator 380, the chronicle processor 385, the backing processor 390, and the version generator 395 will, in some cases, trigger a second workflow while in the midst of processing the first workflow. For instance, the chronicle processor 385 can trigger the second workflow when it calculates and/or detects a predetermined condition such as receiving data from data services 180, and the data aggregator 380 can trigger a third workflow when it calculates and/or detects a value that falls into a predetermined range, such as when the aggregate value of an end-user's annual returns are below a specified level. And, for instance, when the institutes 115 make any request related to processing the resource request they trigger a fourth workflow. The access framework 370, in some (but not other) instances, must verify credentials and permissions for the first workflow as shown in block 615. The access framework 370 can use any number of methods to verify credentials and permission including comparing credentials to those stored in institute credentials 355. If the access framework 370 cannot verify the credentials and permissions, the first workflow stops as shown in block 670. The data processor 360 filters the external HTTP(s) requests and responses for the first workflow request before the workflow manager 325 parses the request as shown in block 620.

The GUI generator 375, the data aggregator 380, the chronicle processor 385, the backing processor 390, and the version generator 395 are all connected to a synchronization bar 630. The workflow manager 325 synchronizes the GUI generator 375, the data aggregator 380, the chronicle processor 385, the backing processor 390, and the version generator 395 as shown in the synchronization bar 630. The workflow manager 325 calculates which of the GUI generator 375, the data aggregator 380, the chronicle processor 385, the backing processor 390, and the version generator 395 processes can run simultaneously and which must wait for the output of another processes. The workflow manager 325 initiates each process accordingly. For example, at block 645, the data aggregator 380 can aggregate data for a given request that may include content objects, data composite values and/or processing results pertaining to a single request or to multiple requests. The chronicle processor 385 can organize the data to generate or update a chronicle corresponding to the request. At block 650, the chronicle processor 385 can process the data from a chronicle to identify missing content objects and/or data (e.g., composite values and/or processing results), whether one or more values satisfy a given condition (e.g., exceed one or more thresholds in one or more defined directions), a status of one or more content objects or resource memorandum, and so on. At block 655, the GUI generator 375 can generate one or more GUIs based on the processing (e.g., to identify missing content objects or data, present an alert of missing data, present a processing alert and/or convey a status).

As shown in the workflow done block 660, when each process is finished the workflow manager 325 computes whether the GUI generator 375, the data aggregator 380, the chronicle processor 385, the backing processor 390, and the version generator 395 processes are complete or if there are processes that still need to be initiated. The workflow manager 325 continues to check if everything is complete at block 660 until all processes in the first workflow are complete. Any number of iterations of starting a new process can happen in block 660 since any of the GUI generator 375, the data aggregator 380, the chronicle processor 385, the backing processor 390, and the version generator 395 processes can trigger a successive workflow. Once there are no more processes to initiate, the workflow manager 325 computes the destination of where it should route the result of the first workflow and forwards it there as shown in box 665. The workflow stops as shown in block 670. Once the first workflow is triggered as shown in block 610, the process 600 for processing a resource request can start again at block 605 if a second workflow or successive workflow is triggered even if the first workflow has not reached block 670 since the workflow manager 325 controls the synchronization as shown in synchronization bar 630.

Figure 7:
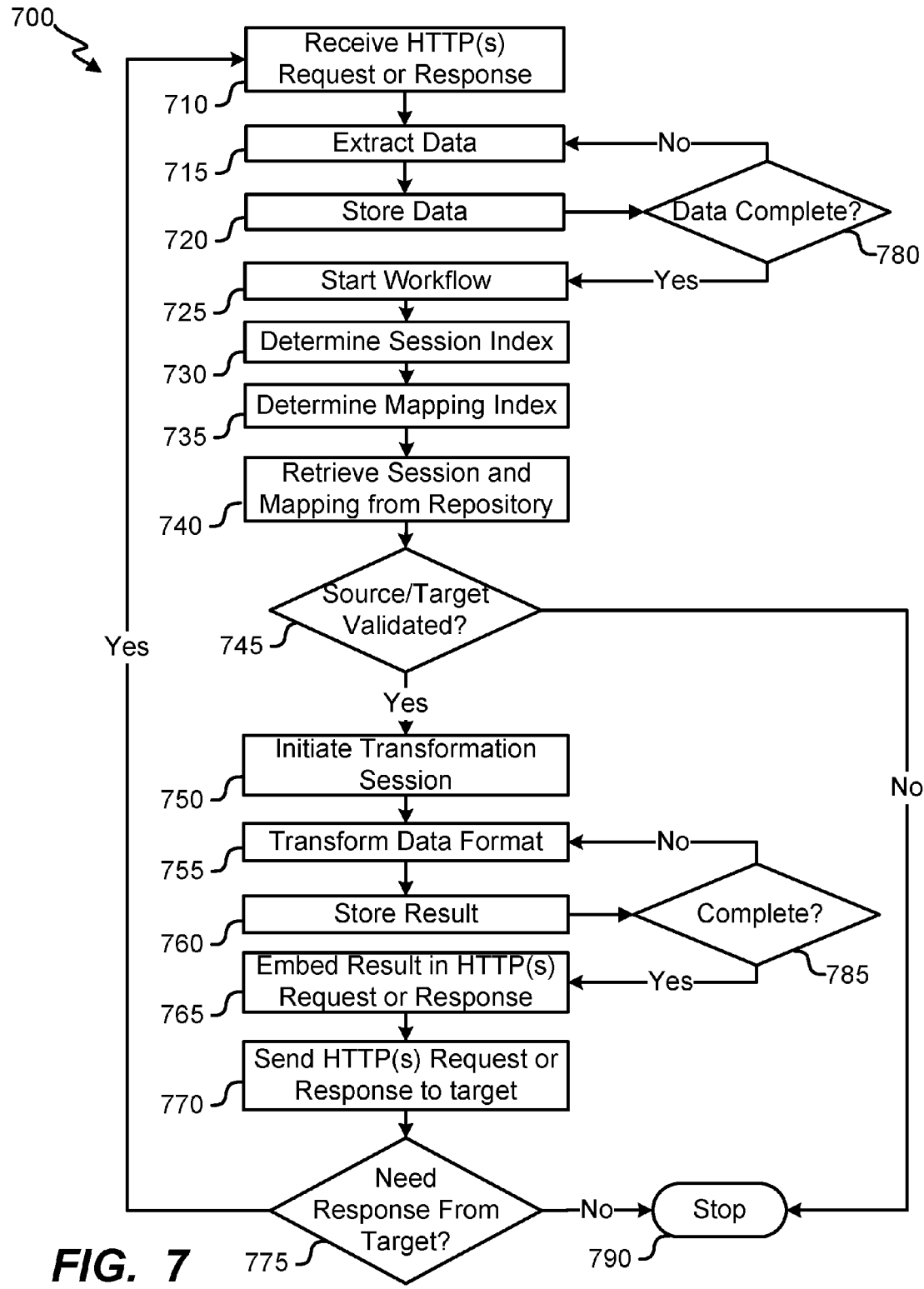
FIG. 7 illustrates a flowchart of the embodiment of a process for transforming source data to target data.

FIG. 7 illustrates a flowchart of the embodiment of a process 700 for transforming the source data format to the target data format. The data interface 365 and the user interface 320 on the chronicle platform 105 receive and transmit data in a first predetermined format. The integration platform 110 executes the process 700 for transforming the source data format to the data format configuration of the data interface 365 and the user interface 320 on the chronicle platform 105 received from the institutes 115 and the data services 180. Conversely, the data services 180 receives and transmits data in a second predetermined format and the institutes 115 transmit and receive data in a third predetermined format. The integration platform 110 also executes the process 700 for transforming the source data format to the target data format for data received by the institutes 115 and the data services 180.

Block 705 shows the start of the process 700 for transforming the source data format to the target format data. The input controller 515 on integration framework 110 receives the HTTP(s) request or response as shown in block 710. The input controller 515 extracts the data from the HTTP(s) as shown in block 715 and stores it in the source cache 520 as shown in block 720. The input controller 515 then checks to make sure that it has received all of the source data as shown in decision block 780. If the input controller 515 has not stored all of the source data it starts the extraction process again as shown in block 715. The input controller 515 will continue to check to make sure it has stored all of the source data in source cache 520 until none is remaining to store, and then the workflow processor 570 starts the workflow as shown in block 725. The workflow processor 570 calculates the session index and the mapping index as shown in blocks 730 and 735 and passes the session index and the mapping index on to the repository server 535. The repository server 535 retrieves the session from the session repository and the mapping from the mapping repository as shown in block 740. The mapping maps the source data format to the target data format. The session is a set of instructions that describe how and when to move the source data format to the target data format.

The load manager 540 validates the target and source credentials as shown in block 745 by matching them to the target and source credentials 580. If the load manager 540 cannot validate the target and source credentials the transformation process stops as shown in block 790. If the load manager 540 validates the target and source credentials it initiates the transformation session as shown in block 750 by triggering the transform manager 545 to start transforming the source data format. The transform manager 545 uses the mapping and the session to transform the source data format for data in the source cache 520 to the target data format as shown in block 755. The transform manager 545 stores the transformed data in the target cache 560 as shown in block 760. The transformation manager then checks to make sure that it has transformed and stored all of the data from the source cache 520, as shown in decision block 785. If the transform manager 545 has not transformed and stored all of the data from the source cache 520, it continues to transform the source data format as shown in block 755 and stores transformed data in the target cache 560 as shown in block 760.

The transform manager 545 iteratively checks to make sure it has transformed all of the data as shown in 785 and stored all of the transformed data in the target cache 560 as shown in blocks 755 and 760. The output controller 555 then embeds the data in the HTTP(s) request or response as shown in block 770 and transmits the data to the target. The workflow processor 570 then determines if the HTTP(s) request or response requires a response as shown in decision block 775 and generates instructions for the input controller 515. One such instance would be when the integration platform 110 sends a request for data from the data services 180. In that case integration platform 110 would need the data from the response from the data services 180 that contains the data it requested. If no response is required, the process 700 for transforming the source data format to the target data format is over as depicted at the block 790. The input controller 515 receives the HTTP(s) response as shown in block 710 if the decision block 775 makes is affirmative and the workflow processor 570 will start the transformation process from block 715 and proceed until it reaches block 790 and stops.

Figure 8:
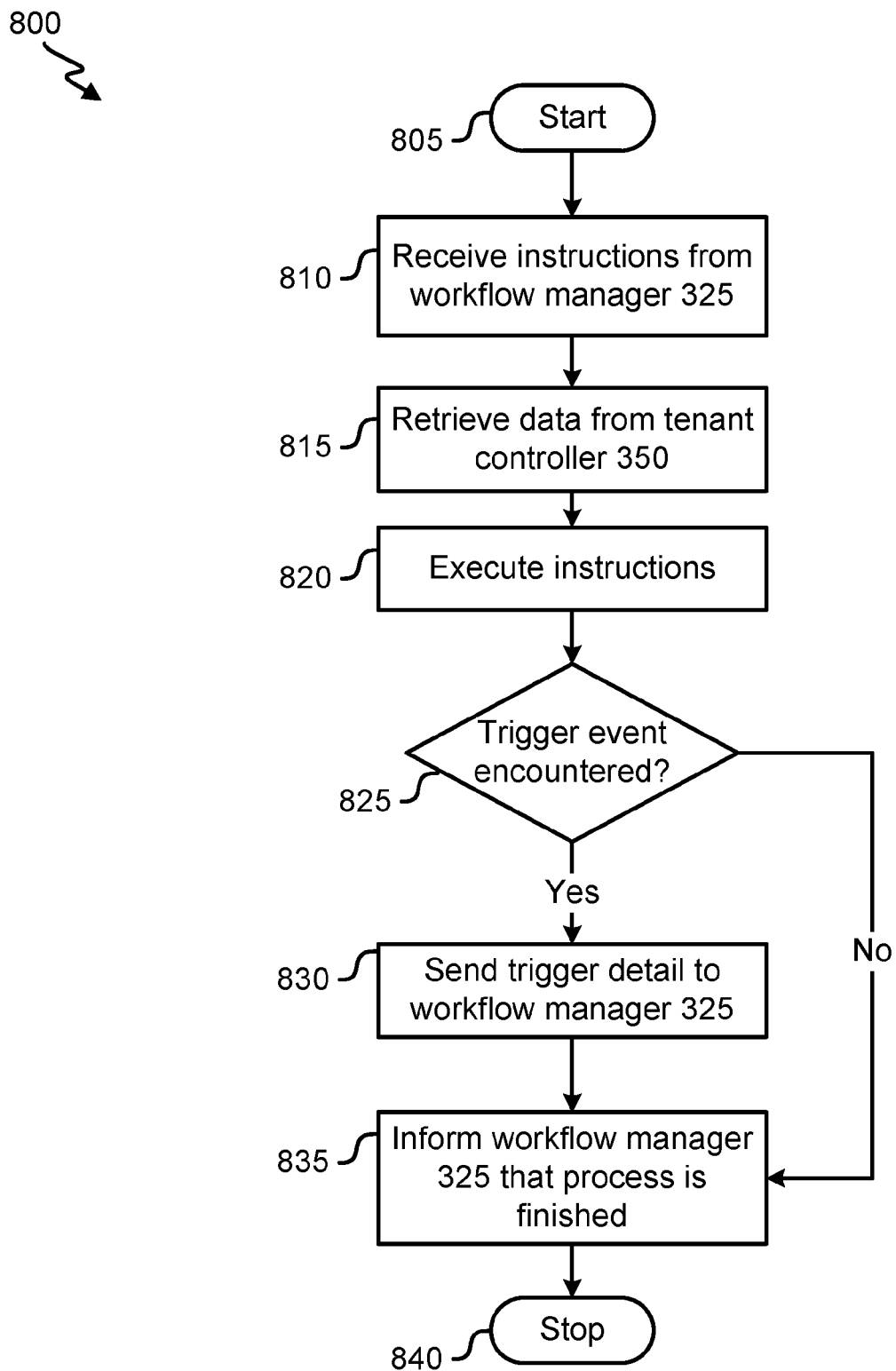
FIG. 8 illustrates a flowchart of the embodiment of a process for processing a resource request.

FIG. 8 illustrates the flowchart of an embodiment of a process 800 for processing a resource request. When the workflow manager 325 detects a trigger to process a resource request (in full or in part), it creates the instructions the chronicle processor 385 needs to process the resource request and sends them to the chronicle processor 385 as shown in block 810. The chronicle processor 385 retrieves the data it needs to process the chronicle, such as a credit report from extension service 135, as shown in block 815. The chronicle processor 385 executes the instructions as shown in block 820. At block 825, it is determined whether processing the resource request according to the instructions causes another triggering event. If so, the chronicle processor 385 sends the trigger detail to the workflow manager 325 as shown in block 830. Upon completion of sending the trigger detail or determining that another triggering event has not been encountered, the chronicle processor 385 informs the workflow manager 325 that it has finished as depicted in block 835. The process 800 is finished as shown in block 840.

Figure 9:
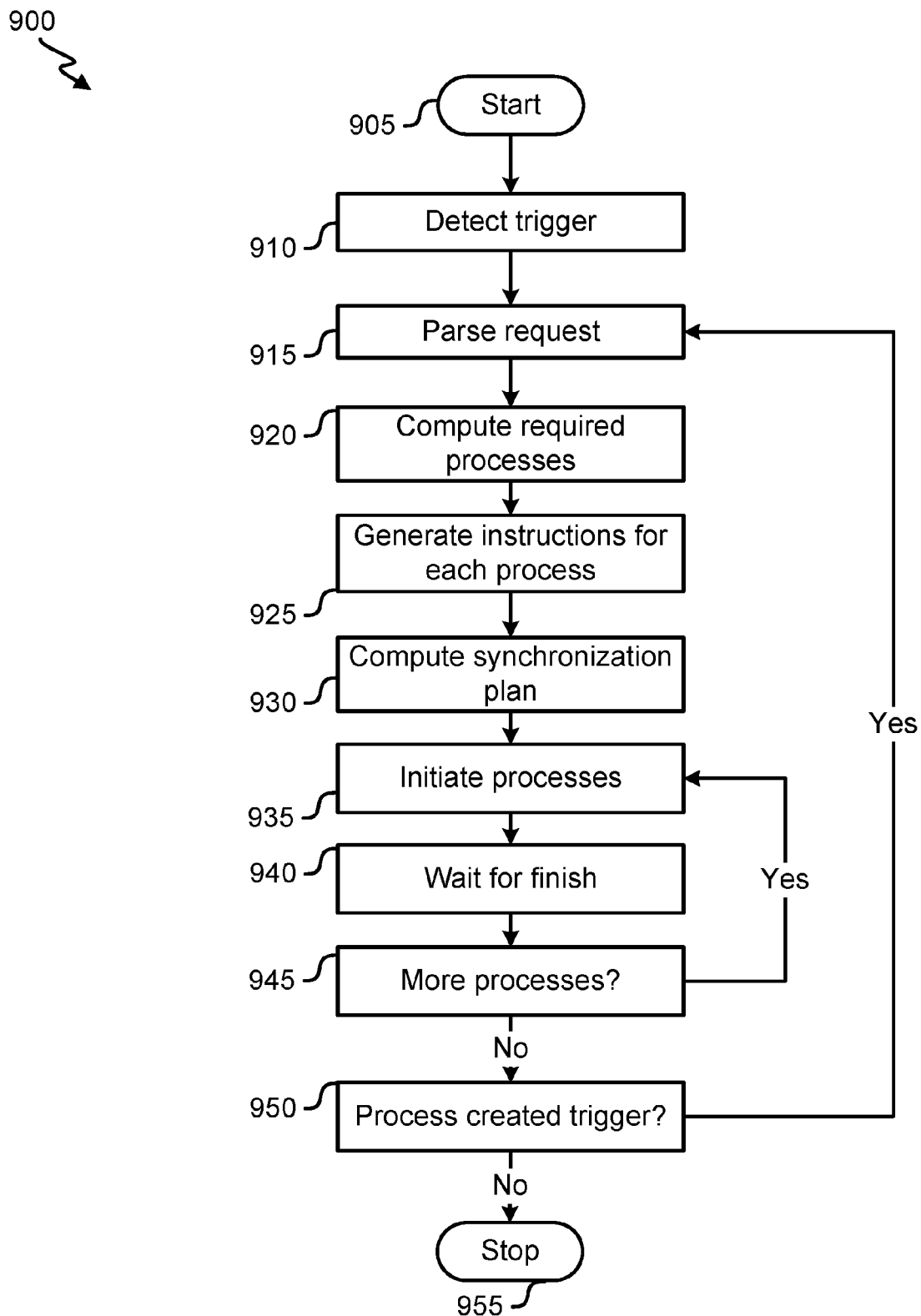
FIG. 9 illustrates the flowchart of the embodiment of a workflow manager processing a workflow.

FIG. 9 illustrates the flowchart of an embodiment of a process 900 for workflow management. When the workflow manager 325 detects a trigger to process a workflow request as shown in block 910, it parses the workflow request as shown in block 915. Because the workflow manager 325 detects triggers generated by processes internal to the chronicle platform 105 and external to it from institutes 115 and/or data services 180, the workflow manager 325 parses triggers from both sources. Once parsed, the workflow manager 325 computes which of the GUI generator 375, the data aggregator 380, the chronicle processor 385, the backing processor 390, and the version generator 395 processes are needed to resolve the workflow request as shown in block 920.

For each of the processes needed to resolve the workflow request, the workflow manager 325 generates a set of instructions as shown in block 925. The workflow manager 325 then computes a synchronization plan as shown in block 930. For instance, if the workflow request is to capture a version of the resource memorandum, the workflow manager 325 is to start the chronicle processor 385 before starting the version generator 395. There are processes that can run simultaneously, for instance the GUI generator 375 can simultaneously process the presentation for reporting receiving a credit report while version generator 395 captures the second version of the resource memorandum. The workflow manager 325 initiates the process according the synchronization plan as shown in block 935. The workflow manager 325 waits for the initiated processes to finish as shown in block 940. Once the initiated process report they are finished, the workflow manager 325 then determines if more processes are to be initiated as shown in block 945. The workflow manager 325 initiates those processes as shown in block 935. This might occur, for instance, if the chronicle processor 385 executes instructions that fill the chronicle with all required content objects to trigger a report to institutes 115 an to capture a version of the resource memorandum. Once there are no processes left to initiate, the workflow manager 325 detects new triggers that the processes generated as shown in block 950. If the workflow manager 325 detects triggers it parses those workflow requests as shown in block 915 and repeat the process 900 until there are no processes to initiate and no triggers detected as shown in in block 955.

Figure 10:
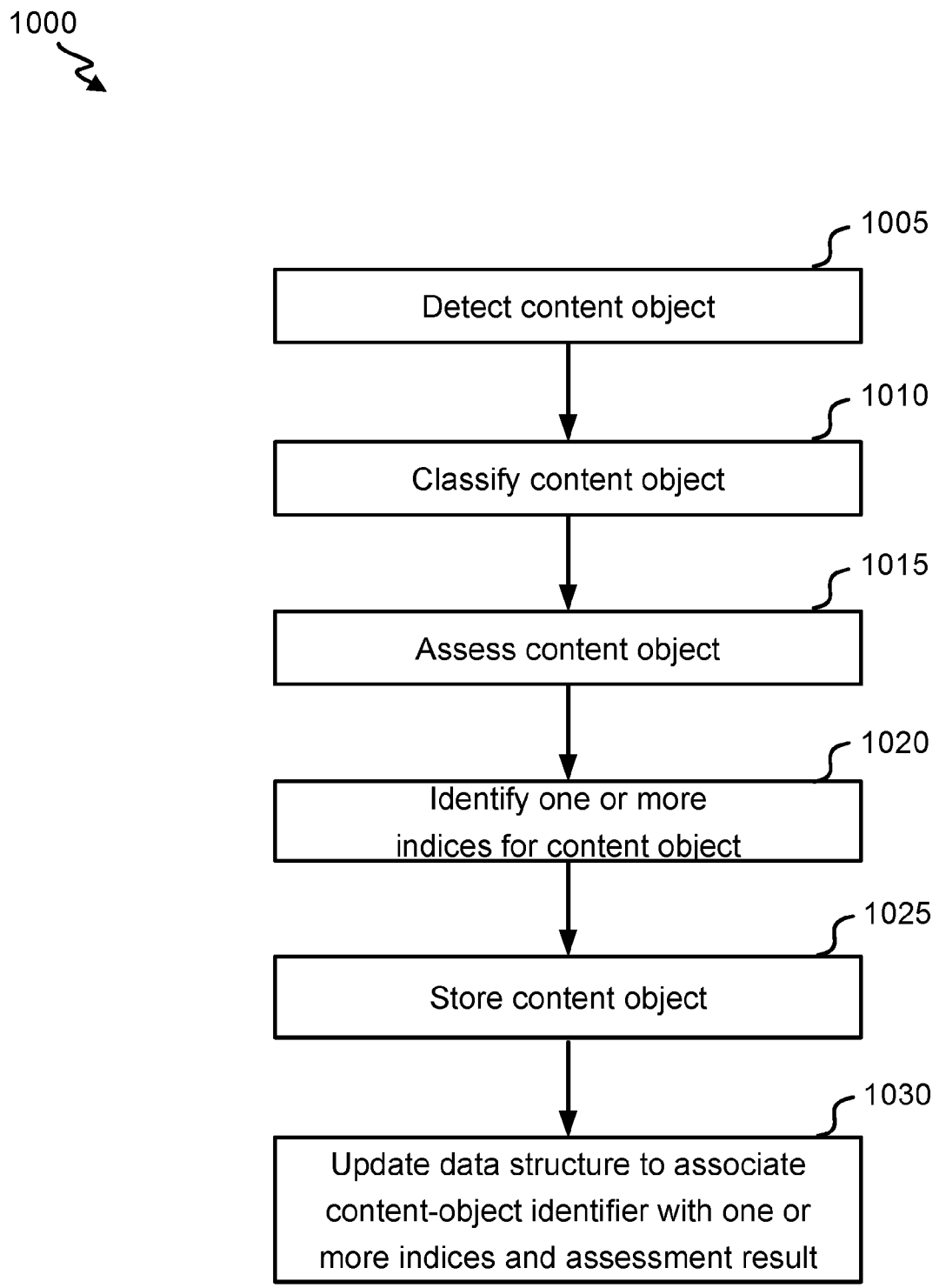
FIG. 10 illustrates a flowchart of an embodiment of a process for processing and storing content objects.

FIG. 10 illustrates a flowchart of an embodiment of a process 1000 for processing and storing content objects. Process 1000 begins at block 1005 where the chronicle processor 385 detects a content object. The content object can include one initially received or generated based on data received via the data interface 365. The content object can include, for example, one uploaded onto a server, one generated based on data received from a device (e.g., a user device or institute device and/or via a webpage interaction) in one or more communications and/or one received from another device. For example, the content object can include one that was received from a device associated with a requestor user and/or a device associated with a user to which a given task had been assigned, The content object can include, for example, an electronic file or a collection of electronic data.

At block 1010, the chronicle processor 385 classifies the content object. Classifying the content object can include identifying a type of the content object. The classification can be performed, for example, by identifying metadata associated with the object, data included within the object (e.g., detecting a particular identifier or field value), a source of the content object, an interface having been provided prior to or during provision of the content object (or data therefor), and/or input received during a process of providing the content object (e.g., identifying the type).

At block 1015, the chronicle processor 385 assesses the content object. The assessment can include, for example, detecting whether a value for each of one or more fields was provided, detecting whether a value is of an particular format and/or detecting whether the content object is of an particular format.

In one instance, the assessment pertains to determining whether a permission or action item assignment indicates that a user and/or user device having provided the content object is authorized to do so for a given request. In some instances, if a permission or action item does not indicate that a user and/or user device having provided the content object is authorized to do so for a given request, a notification may be generated (e.g., by the GUI generator 375) and transmitted that indicates that the content object has not been stored.

At block 1020, the chronicle processor 385 identifies one or more indices for the content object. An index can be identified based on, for example, a value in or associated with the content object or a source of the content object and/or data associated with the content object. For example, indices can include an identifier of an entity included in an object's metadata and an identifier of a request included in the object. One or more indices can also or alternatively be identified based on rules. For example, an index can correspond to an object type, such that all objects of a given type are to be associated with a same index. As another example, a rule can indicate that an index is to represent which entity is assigned to process an object upon upload and can further set forth how such assignment is determined. As yet another example, an index can include one corresponding to a workflow iteration as determined based on a communication session between devices.

In one instance, an index is identified based on a device from which a content object was received and/or one or more permissions or action assignments corresponding to the device (e.g., and/or a user associated with the device). For example, an assignment may indicate that a user corresponding to the device had been assigned an action item to be completed for a particular request. The action item may correspond to providing a content object of a particular type. When a content item of that particular type is received from the device, it may be automatically associated with an index corresponding to the request.

At block 1025, the chronicle processor 385 stores the content object in a content object data store. At block 1030, the chronicle processor 385 updates an object structure to associate an identifier of the content object with the one or more indices and the assessment result. The identifier of the content object can include one pseudorandomly generated or generated in accordance with a technique. The object structure can further identify a location within a content object data store at which the content object is stored. The object structure can further associate the object identifier with other information, such as a time of upload, an entity responsible for the object or processing of the object, a status of the object, a processing to be performed to the object, a size of the object, a source of the object and/or a deadline for processing of the object.

Figure 11:
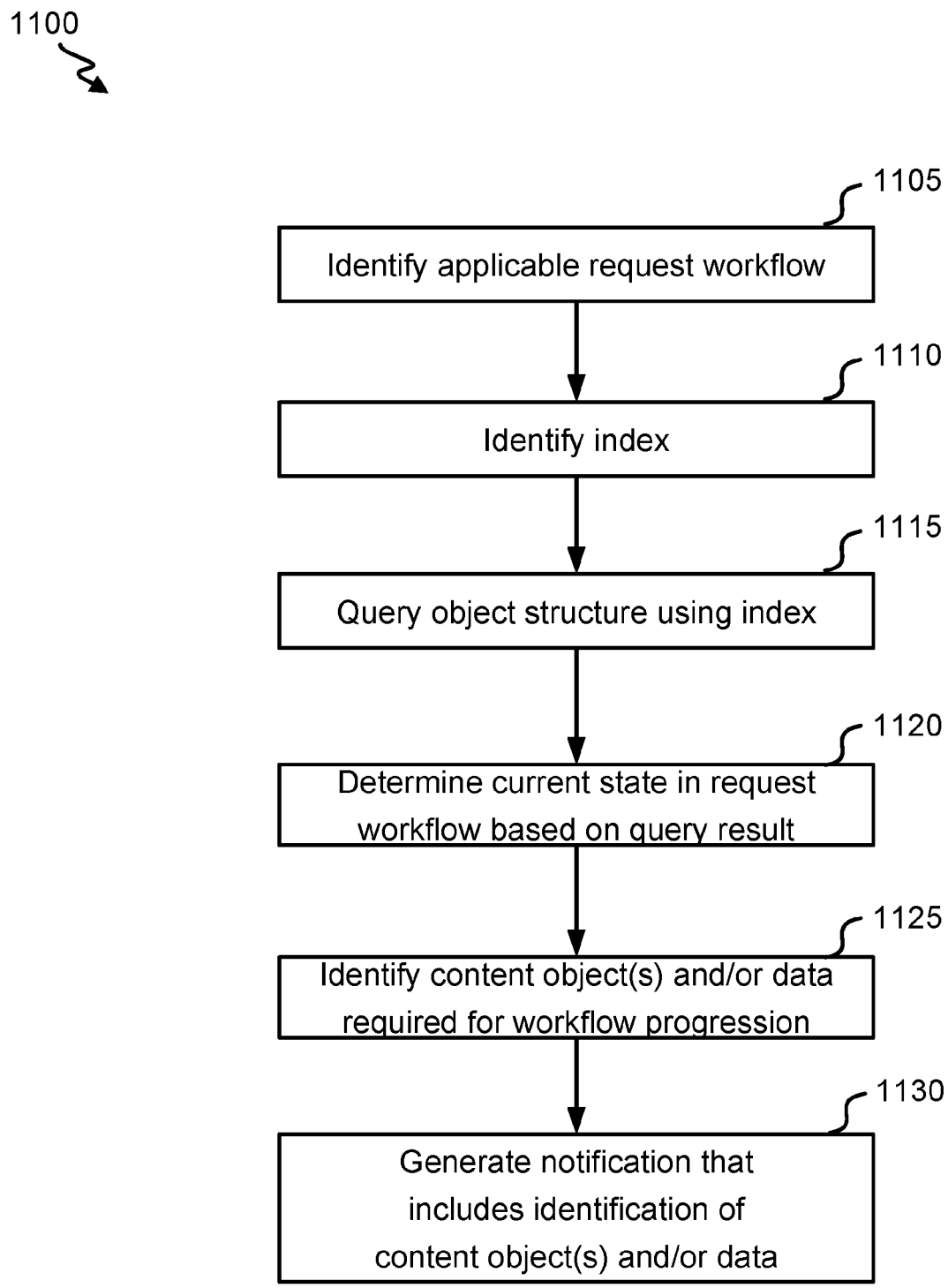
FIG. 11 illustrates a flowchart of an embodiment of a process for assessing progression within a workflow.

FIG. 11 illustrates a flowchart of an embodiment of a process 1100 for assessing progression within a workflow. Process 1100 begins at block 1105 where the workflow manager 325 identifies an applicable request workflow. Identifying the workflow can include identifying a workflow as defined in accordance with a workflow rule, one that pertains to a particular request or one that pertains to a particular type of request. The request workflow can define a plurality of states and progression criteria to progress between states. An applicable workflow can be identified as one that applies to a particular (for example) a particular request, type of request, institute, client, user and/or time period.

At block 1110, the workflow manager 325 identifies an index. The index can correspond to a request, an entity (e.g., client and/or user), object type, workflow iteration (e.g., corresponding to a request), object status, and/or assignee. The index can be one that corresponds to an entity accessing a given system or having submitted a request.

At block 1115, the workflow manager 325 queries an object structure using the index. A result of the query can include, for example, identifiers of one or more or all content objects that are associated with the index (and/or locations of such objects). In some instances, multiple indices can be identified at block 1110, and the object structure can be queried using the multiple indices at block 1115. For example, at block 1110, an index can be identified that corresponds to each of a particular request (and/or workflow iteration) and a user. Block 1115 can include querying the object structure to identify for which action items assigned to the user for the request (and/or workflow iteration) a content object has been provided or otherwise detected.

At block 1120, the workflow manager 325 determines a current state in the request workflow based on a result of the query. The current state can be identified using state definitions and/or progression criteria as defined within the request workflow and further using a result of the object-structure query. In some instances, the workflow manager 325 can determine which state definitions have been met, and identify a current state as one or more of those for which the definition was met (e.g., any state for which a definition was met, one highest in a sequence for which a definition was met, or one highest in a sequence for which a definition of that state and definitions of all prior states were met). In some instances, the workflow manager 325 can determine a state based on progression-criteria analyses. For example, a current state can be identified as one for which all progression criteria pertaining to prior state advancements were satisfied.

For example, each of a set of state definitions for a request workflow can identify types of content objects that are to be collected and/or processed in a particular manner (and/or by a particular entity) during the state. If all such collection and/or processing has occurred, the workflow manager 325 can evaluate a state definition for a next state in the request workflow. This process can continue until arriving at a state definition for which object collection and/or processing is incomplete, and a current state can be identified as that state.

At block 1125, the chronicle processor 385 identifies one or more content objects and/or data (e.g., to be included in a content object) required for workflow progression. This identification can be performed by assessing a progression criterion for the request workflow. The progression criterion can pertain to progression between the current state and another (e.g., next) state or between two other states in the workflow. Identifying the content object(s) and/or data can include, for example, identifying one or more characteristics (e.g., object types, fields and/or formats) or identifying an identifier of an object and/or data. In some instances, block 1125 includes selectively identifying one or more content objects and/or data for a progression criterion that have not already been provided and/or included in a content object data store (e.g., in association with the index). In some instances, block 1125 includes identifying content objects and/or data that are to be provided by a particular entity (e.g., a user), which can be determined based on assignments within the request workflow and/or progression criteria.

At block 1130, GUI generator 375 generates a notification that includes an identification of the required content object(s) and/or data. The notification can be transmitted to and/or presented at, for example, a user device.

As one example, a set of action items corresponding to a workflow iteration and request can be identified. Each of a plurality (or each of all) of the set of action items may include an action item that requires a particular content object or data. Initially, each action item may be assigned to a requestor that initiated or is associated with an initiation of a request (e.g., an entity requesting a resource, such as a loan, treasury service, bank account, lockbox, etc.). One, more or all of the plurality of action items may be configured to permit or preclude assignment of the action item to a different user (e.g., upon receiving input from the requestor that identifies the different user and the action item). Thus, each of the set of actions can be assigned to a user, though multiple action items can be assigned to different entities. The notification generated at block 1130 may identify types content objects and/or other data associated with incomplete action items associated with a given user and a given workflow iteration.

In some instances, the notification identifies types of content objects and/or other data associated with incomplete action items associated with a given user and multiple workflow iterations (or requests). The notification may then indicate to which workflow iteration (or request) an identified type of content object or data corresponds.

The notification may, in some instances, present further information about the workflow iteration, such as a state of the workflow iteration, a result of a processing of a previous analysis involved in the workflow iteration. What additional information is presented may depend on permissions and/or access rights that are granted to the user.

In some instances, the notification identifies types of content objects and/or other data associated with incomplete action items associated with multiple entities and a given workflow iteration (or request). For example, one entity may correspond to a requestor of a request, but the request may be submitted by a user serving as a representative of the entity. The user of the entity may also be related to the entity due to a position (e.g., professional role at the entity). By virtue of this relationship, the user may be assigned one or more action items automatically or in response to assignment instructions received (for example) by the user in the user's representative capacity. The notification may then, for example, include identifications of types of content objects or data corresponding to incomplete action items assigned to the entity, as well as identifications of types of content objects or data corresponding to incomplete action items assigned to the user. In various instances, indications as to whether a given action item is assigned to the entity or user may, but need not, be provided in the notification.

In some instances, the notification identifies types of content objects and/or other data associated with incomplete action items and further indicates, for each of one, more or all of the incomplete action items, a user to which the action item is assigned. The notification may further include or may be otherwise associated with an interface that is configured to receive changes in assignments (e.g., from a user authorized to make such changes).

Figure 12:
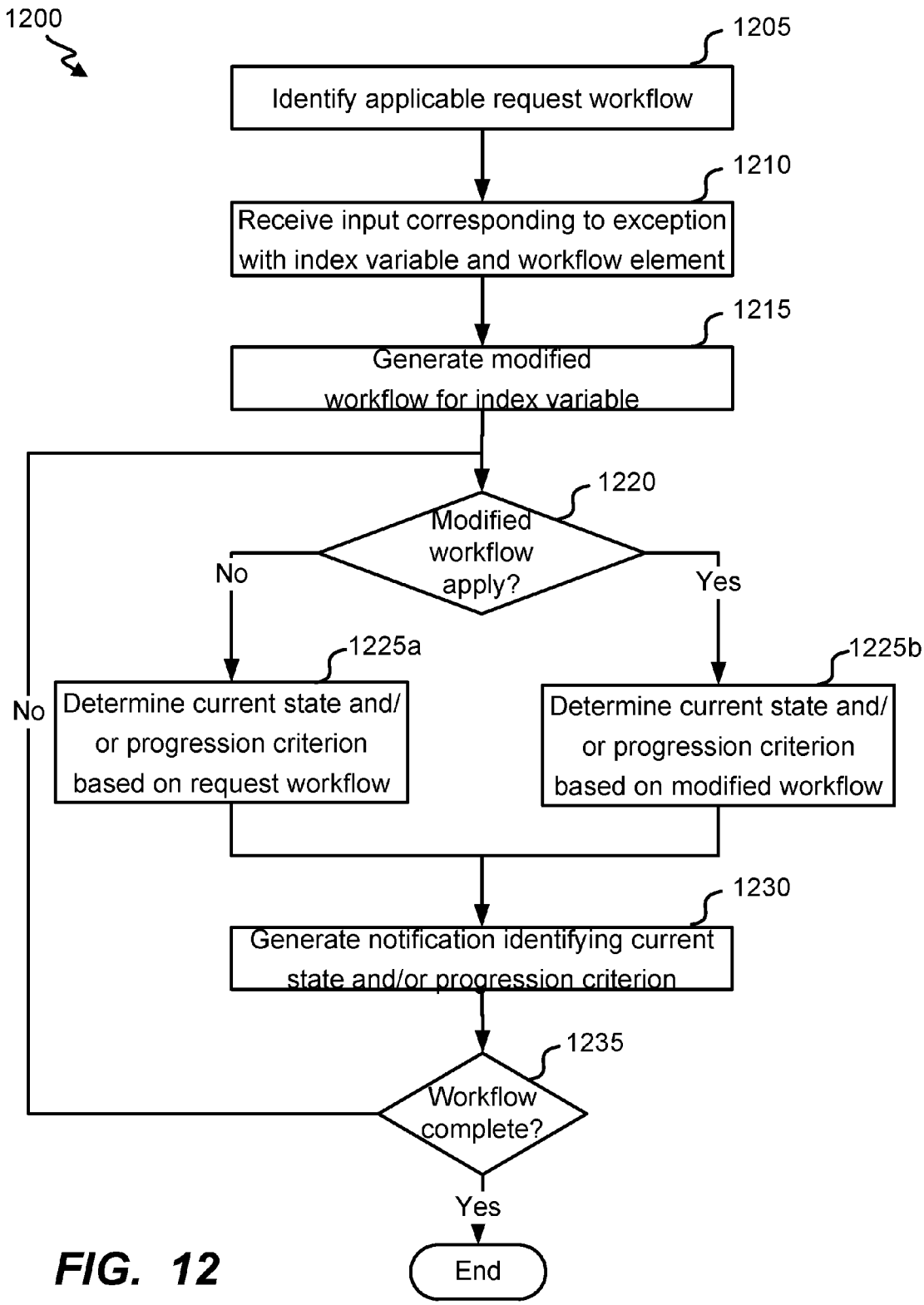
FIG. 12 illustrates a flowchart of an embodiment of a process for generating and using a modified workflow.

FIG. 12 illustrates a flowchart of an embodiment of a process 1200 for generating and using a modified workflow. Process 1200 begins at block 1205 where the workflow manager 325 identifies an applicable request workflow. Identifying the workflow can include identifying a workflow as defined in accordance with a workflow rule. The request workflow can define a plurality of states and progression criteria to progress between states. An applicable workflow can be identified as one that applies to a particular (for example) type of request, client, institute, user and/or time period.

At block 1210, the workflow manager 325 detects an input corresponding to an exception. The input can include one initially received or generated based on data received via the data interface 365. An input can include one detected via a user interface at a client device, institute device or agent device. Such input may have been received during presentation of a notification of content objects, data and/or processing required for a workflow. The input can include, identify and/or be indicative of an index and/or workflow element (e.g., a state or state progression). For example, an input can indicate that Content Object A is not to be required for progression from State A to State B for any requests associated with User Entity Index X.

In some instances, constraints are implemented in terms of potential exception sources and/or exception workflow elements. For example, exception inputs may selectively accepted (for example) only from sources on a list or of a given type, or exception options may only be provided on notifications transmitted to client or institute devices and not other user devices.

In some instances, the input can further include or can be accompanied by data specifying applicability specifications for the exception. The applicability specification can be a conditional application (e.g., do not require Content Object A for State 1 so long as Content Object B was provided for prior State 0, or do not require a value for Field X so long as the value for Field Y exceeded a defined threshold). The applicability specification can be a temporal limitation (e.g., apply the exception during a defined absolute time period, apply the exception until a particular State is reached or apply the exception until particular data is detected in an Object). In some instances, applicability specifications are defined within workflow rules or other rules.

At block 1215, the workflow manager 325 generates a modified workflow for the index. The modified workflow can apply the exception (e.g., to relax or remove an object, data and/or processing requirement for a state or state progression in accordance with the exception input). At block 1220, the workflow manager 325 determines whether the modified workflow is applicable. The determination can be based on an applicability specification associated with the request workflow and/or input and corresponding factors (e.g., a current time, a current state and/or available data).

When it is not determined that the modified workflow is applicable, process 1200 continues to block 1225a where the workflow manager 325 determines a current state and/or a progression criterion based on the request workflow. Block 1225a can correspond to, for example, blocks 1120 and/or 1125 of process 1100. Further, block 1225a can include identifying a progression criterion (or sub-criterion), which can include, for example, a content object or data that is to have been collected, a processing that is to have been performed and/or a processing result that is to have been derived. The progression criterion can include one from a current state (e.g., to a next state) and/or between two other states (e.g., each subsequent to a current state).

When it is determined that the modified workflow is applicable, process 1200 continues to block 1225b where the workflow manager 325 determines a workflow state and/or a progression criterion based on the modified workflow. Block 1225b can correspond to block 1225a except that it uses the modified workflow (e.g., including a modified state definition and/or progression criterion) instead of the request workflow.

At block 1230, the GUI generator 375 generates a notification identifying the current state and/or information pertaining to the progression criterion. Information pertaining to the progression criterion can include one or more action items, a queue and/or one or more queue items. The notification can further include additional information, options and/or features as disclosed herein.

At block 1235, the workflow manager 325 determines whether the workflow is complete. Determining whether the workflow is complete can include, for example, determining whether an iteration of the workflow has progressed to an exit state and/or determining whether a workflow completion criterion has been satisfied. For example, a workflow iteration can be terminated when an action item deadline has passed without corresponding performance of the action or when a processing result corresponding to a final result has been provided or determined. When it is determined that the workflow is not complete, process 1200 returns to block 1220.

Figure 13:
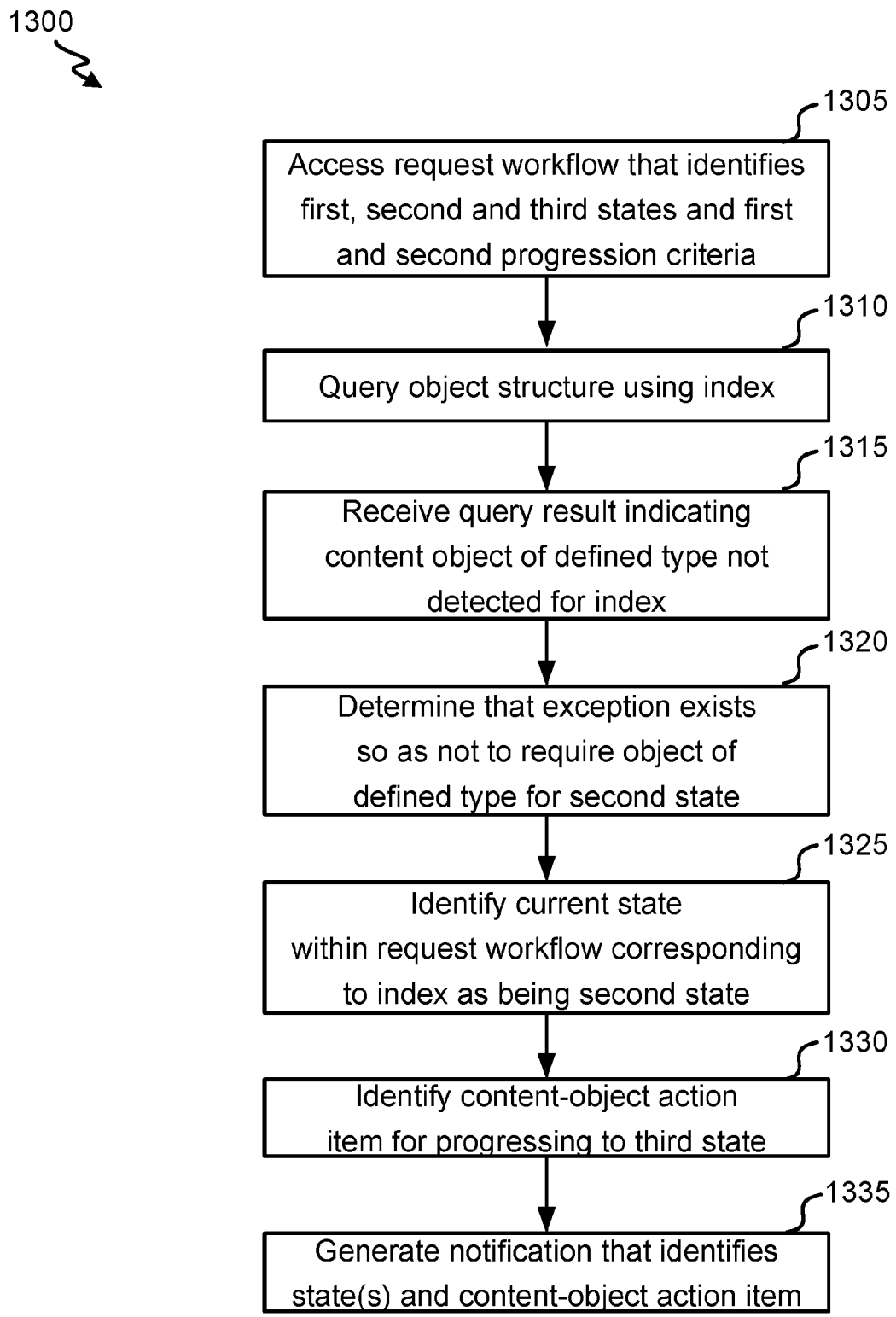
FIG. 13 illustrates a flowchart of an embodiment of a process for assessing progression within a workflow in view of potential workflow exception.

FIG. 13 illustrates a flowchart of an embodiment of a process 1300 for assessing progression within a workflow in view of potential workflow exception. Process 1300 begins at block 1305 where the workflow manager 325 accesses a request workflow that identifies multiple states and first and second progression criteria. The multiple states can include a first, second and third states. The request workflow can be that pertains to a particular (for example) type of request, client, user and/or time period.

The first progression criterion can include one that sets forth requirements for progressing from the first state to the second state and can include a requirement that a content object of a defined first type must have been received or detected. The second progression criterion can include one that sets forth requirements for progressing to the third state (e.g., from the second state) and can include a requirement that a content object of a defined second type have been received or detected.

At block 1310, the chronicle processor 385 queries an object structure using an index. The index can correspond to, for example, an entity (e.g., institute, client and/or user), object type, workflow iteration (or request), object status, and/or assignee. The index can be one that corresponds to an entity accessing a given system or having submitted a request. The query can be structured so as to determine, for example, whether a content object (associated with the index) of the first type is present in a content object data store. Further or alternatively, the query can be structured to determine whether a particular type of content object (associated with the index) has undergone a defined type of processing and/or whether a particular processing result (e.g., an approval) has been produced based on a content object associated with the index.

In one instance, the workflow manager 325 may have previously identified a past state for a particular workflow iteration as being the first state. The query can then be structured to collect data needed to evaluate the first progression criterion. In one instance, the workflow manager 325 may have previously identified one or more action items pertaining to a workflow iteration. The query can then be structured to evaluate whether each of the one or more action items had been completed.

At block 1315, the chronicle processor 385 receives a query result that indicates a content object of the first type and associated with the index was not detected (e.g., in a content object data store) and/or not identified in an object structure (e.g., generally or identified but being associated with a variable indicating that the object has not been received in general or in its entirety).

At block 1320, the workflow manager 325 determines that an exception to the request workflow exists for the index. The determination can include determining whether an exception to the request workflow exists that would relax or eliminate a requirement for collection of the content object of the defined type in general, to progress to the second state and/or for a second-state status.

The exception can be one that permits at least temporary progression from the first state to the second state despite lack of a detection of the content object of the defined first type. The exception can include one having been generated in response to an action performed at a client device. In some instances, the exception can apply (e.g., for the index) permanently during iteration of the workflow. In some instances, the exception is configured to permit progression to the second state despite an absence of the object of the defined first type, but a progression to another state (e.g., the third state or a final state) may nonetheless require the content object of the first type.

At block 1325, the workflow manager 325 identifies a current state within the request workflow corresponding to the index as being the second state. This determination can be supported based on the existence of the exception and a determination that other requirements for being within or entering the second state are met (e.g., content objects of other types were detected in association with the index, required processing of objects had been performed in association with the index and/or required processing results were obtained in association with the index). This determination may further include determining, for example, that criteria for one, more or all states below the second state (e.g., in a sequence) were also satisfied and/or that criteria for one, more or all states above the second states were not satisfied.

At block 1330, the workflow manager 325 identifies a content-object action item for progressing to a third state. The content-object action item can include an identification of the defined second type as specified in the second progression criteria. One or more other action items can alternatively or further be identified. Such other action items can include an action item pertaining to securement of the content object of the first type (e.g., which may be required for progression to the third state even if not for the second state), processing of one or more content items, and so on. These other action items can correspond to part or all of progression criteria between the second and third states or between other states. When multiple action items are identified, the workflow manager 325 may further (in some instances) filter between the items and/or arrange the items (e.g., according to an order).

At block 1335, the GUI generator 385 generates a notification that identifies one or more states and the content-object action item. The one or more states can, in some instances, include a single state, which can be the second state (e.g., identified as the current state) or the third state (e.g., identified as the next state). The one or more states can, in some instances, be a plurality of states that are included in the request workflow, and the second and/or third state may be selectively identified as corresponding to the current and/or next state. In some instances, the notification includes multiple action items, which may be arranged and/or presented in accordance with a prioritization of the items.

We hereby incorporate each of the following applications in its entirety for all purposes: U.S. Provisional Application No. 61/714,647, filed on Oct. 16, 2012; U.S. Provisional Application No. 61/652,970, filed on May 30, 2012; U.S. Provisional Application No. 61/652,977, filed on May 30, 2012; U.S. Provisional Application No. 61/792,011, filed on Mar. 15, 2013; U.S. Provisional Application No. 62/032,239, filed on Aug. 1, 2014; U.S. Provisional Application No. 62/102,196, filed on Jan. 12, 2015; U.S. Provisional Application No. 62/187,487, filed on Jul. 1, 2015; U.S. patent application Ser. No. 14/713,899 filed on May 15, 2015; U.S. patent application Ser. No. 14/590,714 filed on Jan. 6, 2015; U.S. Pat. No. 9,098,875 issued on Aug. 4, 2015; U.S. Pat. No. 9,098,875 issued on Aug. 4, 2015; U.S. Pat. No. 9,082,151 issued on Jul. 14, 2015; U.S. Pat. No. 8,762,376 issued on Jun. 24, 2014; and U.S. Pat. No. 8,572,083 issued on Oct. 29, 2013.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A coordinated system for managing content objects and workflows across devices, the coordinated system comprising:
   an object structure that associates, for each of a plurality of content objects, an identifier of the content object with one or more indices;
   a workflow rules data store that includes a request workflow that identifies:
      each of a plurality of states within the request workflow;
      a first progression criterion for progressing from a first state in the plurality of states to a second state in the plurality of states, the first progression criterion including detection of a content object of a defined first type; and
      a second progression criterion for progressing to a third state in the plurality of states, the second progression criterion including detection of a content object of a defined second type; and
   a chronicle processor that:
   queries the object structure using an index and that receives a query result indicating that the content object of the defined first type was not detected; detects an uploaded content object; and
   a workflow manager that includes one or more hardware processors and that:
      determines that an exception to the request workflow exists for the index that permits at least temporary progression from the first state to the second state despite lack of a detection of the content object of the defined first type, the exception having been generated in response to an action performed at a client device;
      identifies, in correspondence to the index, a current state within the request workflow as being the second state; and
      identifies a content-object action item defined in a progression criterion for progressing to the third state, the content-object action item identifying the defined second type; and
      identifies the uploaded content object as being of the defined second type; and
      identifies the uploaded content object as being associated with the index;
      wherein, in response to identifying the uploaded content object as being of the defined second type and identifying the uploaded content object as being associated with the index, the notification is updated to remove or modify the content-object action item; and
   a graphical user interface (GUI) generator that generates a notification for presentation at a user device that identifies:
      the second state or the third state; and
      the content-object action item.

2. The coordinated system for managing content objects and workflows across devices as recited in claim 1, wherein the chronicle processor further:
   identifies that a processed content object is erroneous or incomplete, the notification further identifying the processed content object and reflecting that the processed content object was identified as being erroneous or incomplete.

3. The coordinated system for managing content objects and workflows across devices as recited in claim 1, wherein the content-object action item defined in the progression criterion for progressing to the third state is identified based on the query result, the query result further indicating that a second content object of the defined second type was not detected.

4. The coordinated system for managing content objects and workflows across devices as recited in claim 1, wherein:
   the second progression criterion is for progressing from the second state to the third state;
   the notification further identifies a content object queued for review for the request workflow corresponding to the index, and
   the second progression criterion further includes completion of review of the content object queued for review.

5. The coordinated system for managing content objects and workflows across devices as recited in claim 1, wherein:
   the plurality of states further includes an intermediate state;
   the request workflow further identifies an intermediate progression criterion for progressing from the second state to the intermediate state; and
   the query result indicates that the intermediate progression criterion has not been satisfied such that completion of the content-object action item is insufficient for the current state to progress to the third state.

6. The coordinated system for managing content objects and workflows across devices as recited in claim 1, wherein:
   the workflow manager subsequently detects that the exception to the request workflow no longer exists; and
   in response to detecting that the exception to the request workflow no longer exists:
      the workflow manager identifies a second content-object action item indicating that the content object of the defined first type is included in a progression criterion for progressing; and
      the GUI generator generates a second notification for presentation that identifies the second content-object action item.

7. A hardware processor based computer-implemented method for managing content objects and workflows across devices, the method comprising:
   accessing a request workflow that identifies:
      each of a plurality of states within the request workflow;
      a first progression criterion for progressing from a first state in the plurality of states to a second state in the plurality of states, the first progression criterion including detection of a content object of a defined first type; and
      a second progression criterion for progressing to a third state in the plurality of states, the second progression criterion including detection of a content object of a defined second type;
   querying, using an index and using one or more processors, an object structure that associates, for each of a plurality of content objects, an identifier of the content object with one or more indices;
   detecting a result to the query that indicates that a content object of the defined first type was not detected;
   determining that an exception to the request workflow exists for the index that permits at least temporary progression from the first state to the second state despite lack of a detection of the content object of the defined first type, the exception having been generated in response to an action performed at a client device;
   identifying, in correspondence to the index, a current state within the request workflow as being the second state;

identifying a content-object action item defined in a progression criterion for progressing to the third state, the content-object action item identifying the defined second type; and detecting an uploaded content object;

identifying the uploaded content object as being of the defined second type;

identifying the uploaded content object as being associated with the index; and in response to identifying the uploaded content object as being of the defined second type and identifying the uploaded content object as being associated with the index, updating the notification to remove or modify the content-object action item; and generating a notification for presentation at a user device that identifies:
the second state or the third state; and
the content-object action item.

8. The method for managing content objects and workflows across devices as recited in claim 7, further comprising:
identifying that a processed content object is erroneous or incomplete, the notification further identifying the processed content object and reflecting that the processed content object was identified as being erroneous or incomplete.

9. The method for managing content objects and workflows across devices as recited in claim 7, wherein the content-object action item defined in the progression criterion for progressing to the third state is identified based on the query result, the query result further indicating that a second content object of the defined second type was not detected.

10. The method for managing content objects and workflows across devices as recited in claim 7, wherein:
the second progression criterion is for progressing from the second state to the third state;
the notification further identifies a content object queued for review for the request workflow corresponding to the index, and
the second progression criterion further includes completion of review of the content object queued for review.

11. The method for managing content objects and workflows across devices as recited in claim 7, wherein:
the plurality of states further includes an intermediate state;
the request workflow further identifies an intermediate progression criterion for progressing from the second state to the intermediate state; and
the query result indicates that the intermediate progression criterion has not been satisfied such that completion of the content-object action item is insufficient for the current state to progress to the third state.

12. The method for managing content objects and workflows across devices as recited in claim 7, further comprising:
subsequently detecting that the exception to the request workflow no longer exists; and
in response to detecting that the exception to the request workflow no longer exists:
identifying a second content-object action item indicating that the content object of the defined first type is required; and
generating a second notification for presentation that identifies the second content-object action item.

13. A non-transitory computer-readable medium having sets of instructions stored thereon which, when executed by one or more processors, cause the one or more processors to perform actions including:
accessing a request workflow that identifies:
each of a plurality of states within the request workflow;
a first progression criterion for progressing from a first state in the plurality of states to a second state in the plurality of states, the first progression criterion including detection of a content object of a defined first type; and
a second progression criterion for progressing to a third state in the plurality of states, the second progression criterion including detection of a content object of a defined second type; and
querying, using an index, an object structure that associates, for each of a plurality of content objects, an identifier of the content object with one or more indices
detecting a result to the query that indicates that a content object of the defined first type was not detected;
determining that an exception to the request workflow exists for the index that permits at least temporary progression from the first state to the second state despite lack of a detection of the content object of the defined first type, the exception having been generated in response to an action performed at a client device;
identifying, in correspondence to the index, a current state within the request workflow as being the second state;
identifying a content-object action item defined in a progression criterion for progressing to the third state, the content-object action item identifying the defined second type; and
detecting an uploaded content object;
identifying the uploaded content object as being of the defined second type;
identifying the uploaded content object as being associated with the index; and
in response to identifying the uploaded content object as being of the defined second type and identifying the uploaded content object as being associated with the index, updating the notification to remove or modify the content-object action item; and
generating a notification for presentation at a user device that identifies:
the second state or the third state; and
the content-object action item.

14. The non-transitory computer-readable medium as recited in claim 13, the actions further including:
identifying that a processed content object is erroneous or incomplete, the notification further identifying the processed content object and reflecting that the processed content object was identified as being erroneous or incomplete.

15. The non-transitory computer-readable medium as recited in claim 13, wherein the content-object action item defined in the progression criterion for progressing to the third state is identified based on the query result, the query result further indicating that a second content object of the defined second type was not detected.

16. The non-transitory computer-readable medium as recited in claim 13, wherein:
the second progression criterion is for progressing from the second state to the third state;
the notification further identifies a content object queued for review for the request workflow corresponding to the index, and the second progression criterion further includes completion of review of the content object queued for review.

17. The non-transitory computer-readable medium as recited in claim 13, wherein:
the plurality of states further includes an intermediate state;
the request workflow further identifies an intermediate progression criterion for progressing from the second state to the intermediate state; and
the query result indicates that the intermediate progression criterion has not been satisfied such that completion of the content-object action item is insufficient for the current state to progress to the third state.

* * * * *